(12) United States Patent
Tarpan et al.

(10) Patent No.: US 11,016,375 B2
(45) Date of Patent: May 25, 2021

(54) CONTROL OF COLOR PRIMARIES AND WHITE POINT IN A LASER-PHOSPHOR PROJECTOR

(71) Applicant: BARCO N.V., Kortrijk (BE)

(72) Inventors: Mihaela Tarpan, Lochristi (BE); Allel Chedad, Zwevegem (BE); Bart Maximus, Oudenaarde (BE); Nico Coulier, Machelen (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 16/799,044

(22) Filed: Feb. 24, 2020

(65) Prior Publication Data

US 2020/0192204 A1  Jun. 18, 2020

Related U.S. Application Data

(63) Continuation-in-part of application No. 16/072,621, filed as application No. PCT/EP2017/051701 on Jan. 26, 2017, now Pat. No. 10,574,951.

(30) Foreign Application Priority Data

Jan. 26, 2016 (BE) .................................. 2016/5067
Feb. 4, 2016 (BE) .................................. 2016/5089

(Continued)

(51) Int. Cl.
*G06F 3/038* (2013.01)
*G03B 21/20* (2006.01)

(52) U.S. Cl.
CPC ......... *G03B 21/204* (2013.01); *G03B 21/208* (2013.01)

(58) Field of Classification Search
CPC ............... G03B 21/204; G03B 21/208; G03B 21/2013; G03B 21/206
See application file for complete search history.

(56) References Cited

U.S. PATENT DOCUMENTS

| 5,986,815 A | 11/1999 | Bryars |
| 9,024,241 B2 | 5/2015 | Wang et al. |

(Continued)

FOREIGN PATENT DOCUMENTS

| CN | 102081292 A | 6/2011 |
| CN | 103018864 A | 4/2013 |

(Continued)

OTHER PUBLICATIONS

Chinese Office Action in corresponding Chinese Application No. 201780019119.5, dated May 8, 2020.

(Continued)

*Primary Examiner* — Adam R. Giesy
(74) *Attorney, Agent, or Firm* — Bacon & Thomas, PLLC

(57) ABSTRACT

A light projection system for generating an image with three primary colors, each primary color being respectively defined by a first, second and third wavebands. The system includes a first blue laser source emitting a first beam in a fourth waveband, the first blue laser source having a first laser driver, a second blue laser source emitting a second beam having a central wavelength and a fifth waveband, the second blue laser source having a second laser driver, a substrate having a wavelength conversion element for emitting light at a plurality of wavelengths after absorption of a light beam at an excitation wavelength within a fifth waveband of the second blue laser source and a beam combiner for combining the combined first beam and the converted beam, which combination results in a white beam. Dichroic losses can be reduced by using a green phosphor together with red laser assistance.

17 Claims, 11 Drawing Sheets

(30) Foreign Application Priority Data

Feb. 4, 2016 (BE) .................................. 2016/5090
Feb. 4, 2016 (BE) .................................. 2016/5091

(56) References Cited

U.S. PATENT DOCUMENTS

| | | |
|---|---|---|
| 9,274,407 B2 | 3/2016 | Wang et al. |
| 2008/0191234 A1 | 8/2008 | Kang et al. |
| 2011/0292349 A1 | 12/2011 | Kitano |
| 2011/0304659 A1 | 12/2011 | Lee et al. |
| 2013/0083295 A1 | 4/2013 | Miyazaki |
| 2013/0100644 A1 | 4/2013 | Hu et al. |
| 2013/0194551 A1 | 8/2013 | Zhang et al. |
| 2013/0215397 A1 | 8/2013 | Matsubara |
| 2014/0369025 A1 | 12/2014 | Mehl |
| 2015/0002823 A1 | 1/2015 | Yan |
| 2015/0205190 A1* | 7/2015 | Fukami ............... H04N 9/3111 353/31 |
| 2015/0341605 A1 | 11/2015 | Yamada et al. |
| 2016/0116122 A1 | 4/2016 | Chang et al. |
| 2016/0178141 A1 | 6/2016 | Bichler |

FOREIGN PATENT DOCUMENTS

| | | |
|---|---|---|
| CN | 103676145 A | 3/2014 |
| CN | 104656356 A | 5/2015 |
| CN | 104793453 A | 7/2015 |
| CN | 105204279 A | 12/2015 |
| EP | 2712194 A1 | 3/2014 |
| JP | 2016-6523 A | 1/2016 |
| TW | 1448806 B | 8/2014 |
| WO | 03/058587 A2 | 7/2003 |

OTHER PUBLICATIONS

International Search Report for PCT/EP2017/051701 dated May 12, 2017.
Written Opinion for PCT/EP2017/051701 dated May 12, 2017.
The GNY AG3557 from Intematix portfolio http://www.intematix.com/uploads/Phosphor%20Family%20Sheets/NYAGSingleSheet.pdf (2014).
Jorg Meyer, Frank Tappe, Nico Schmidt, "Future of Lighting," http://www.chemistryviews.org/details/ezine/7897011/The Future of Lighting.html, DOI: 10.1002/chemv.201500033, Copyright: Wiley-VCR Verlag GmbH & Co. KGaA, Weinheim (May 5, 2015).
Chinese Office Action in corresponding Chinese Application No. 201780019119.5, dated Dec. 3, 2020.

* cited by examiner

Fig. 18
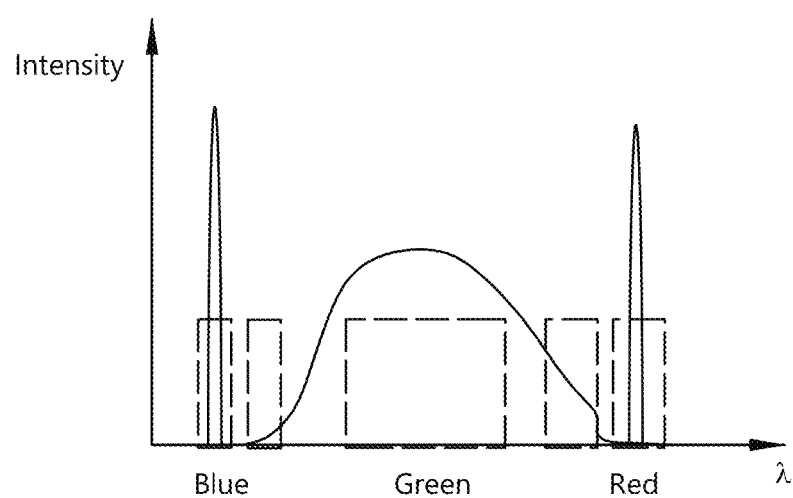
Fig. 19a
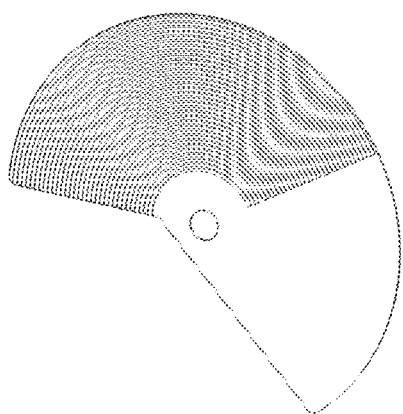
Fig. 19b
Fig. 19c
Fig. 19d   Fig. 19e
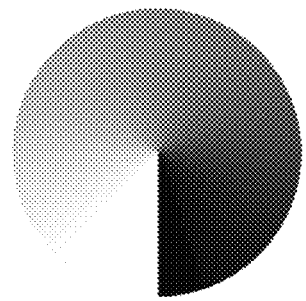
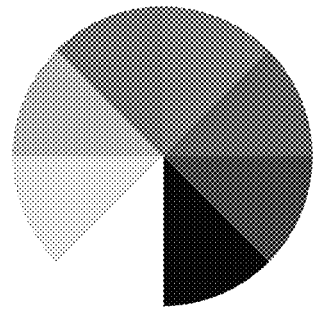

CONTROL OF COLOR PRIMARIES AND WHITE POINT IN A LASER-PHOSPHOR PROJECTOR

CROSS-REFERENCE OF RELATED APPLICATIONS

This application is a continuation-in-part application of U.S. application Ser. No. 16/072,621, filed Jul. 25, 2018, and granted as U.S. Pat. No. 10,574,951, which is the national phase entry of international application PCT/EP2017/051701, filed Jan. 26, 2017, which claims the benefit of Belgium applications BE 2016/5089 filed Feb. 4, 2016, BE 2016/5091 filed Feb. 4, 2016, BE 2016/5090 filed Feb. 4, 2016, and BE 2016/5067 filed Jan. 26, 2016, all of which are incorporated herein by reference.

The present invention relates to an optical sub-assembly, a projector and method of operating a projector, a controller for controlling a projector and a method of controlling a projector.

BACKGROUND OF THE INVENTION

Projection technology makes increasing use of solid state light sources instead of the conventional lamps, e.g. using lasers in a single-chip DLP projector, in three-chip DLP projectors or in other projectors with 3 imagers (LCD, LCoS, . . . ).

Laser-based solid state projectors could be classified in two main categories:
  Full laser projectors (using direct red, green and blue lasers)
  Laser phosphor projectors (using blue laser to excite a wavelength convertor material to generate some of the three primaries)

Currently, the full laser projectors are typically ultra-bright projectors aimed at the niche market of digital cinema (DC). Laser phosphor projectors mainly have a lower light output, i.e. under 12,000 lumens and therefore are sold in the markets outside digital cinema. However, recent improvements in the phosphor technology allow laser phosphor projectors to achieve even brightness levels up to 20,000 lumens and possibly higher.

High brightness and colour performance are important because a digital cinema projector has to project images according to the DCI standard, including for instance a typical wider colour gamut.

In markets outside digital cinema a different colour gamut of the projector can be set such as to the REC709 colour gamut. But it is very important to mention that REC709 is only a recommendation, not a standard. Therefore the colour performance of the projectors can vary widely for instance for the colour point of the primaries, their colour to white ratios and the white colour point. The DCI standard is much stricter and defines the colour gamut and the white point of a Digital Cinema projection system. Some tolerances are allowed via narrow tolerance boxes expressed in a colour diagram for the white colour point and the colour points of the primary colours.

A comparison between the REC709 colour gamut and the DCI colour gamut is presented in FIG. 1.

Current laser-phosphor 3-chip projectors generate red green and blue primaries using blue lasers to excite a phosphor wavelength convertor and to generate yellow light. Direct blue laser light is added to the phosphor yellow light to create a white source. Blue lasers are preferred instead of blue LED's for the phosphor excitation due to the smaller étendue of laser light. Sometimes, additional red lasers or red LEDs are added to improve the red content. The typical optical spectrum of such a white illumination source consisting of direct blue lasers and yellow phosphor is presented in FIG. 2.

The colour point for the white laser+phosphor light source will vary due to a number of design choices. Additionally, with regard to the blue primary color point, for direct blue lasers the wavelength can vary in the interval 440 nm and 470 nm and one wavelength or a combination of different wavelengths can be used in this interval. The wavelength of the blue lasers can have some impact on the white point although their intensity or power level has much more impact. The selection of the blue laser has an impact on the location of the blue primary color point, in other words the left bottom corner of the color gamut.

The blue laser+yellow phosphor architecture has become very popular for projectors in the markets outside digital cinema due to its reduced complexity and right balance between performance and cost. The wavelength convertor for example is only one type of phosphor used to create both the red and the green component. Moreover, yellow phosphors with very good performance (e.g. high conversion efficiency, chemically stable, good quenching performance etc.) are readily available and the most popular example is the YAG:Ce phosphor used in white LEDs for lighting and backlighting applications. It is a well-known fact however that the application of red phosphors is not simple mainly due to the fact that red phosphors have poor thermal behaviour and they quench at temperatures much lower than those observed for good yellow phosphors. Also, the conversion efficiency of the red phosphors is much lower than that of a yellow phosphor (e.g. 30-35% compared with 60-65%). Hence having a good performing yellow phosphor with a significant red content has become in many cases the solution of choice.

However, for DCI compliant projectors, this very popular solution of only using blue lasers and a yellow phosphor proved to be rather limiting and additional improvements are required.

In order to have a DCI compliant projector when using such a white direct blue laser+yellow phosphor source a number of steps need to be carried out.

The first step is to achieve the native red, green and blue primaries according to the DCI spec. For most of the 3-chip projectors the splitting of the light generated by the light source into the three primaries, happening in the imaging module of the projector, is done by the Philips prism as seen in the FIG. 3. The Philips prism is also responsible for the initial filtering of the light. This filtering is a result of the typical difference of Angle Of Incidence (AOI) on the Philips prism coatings for incoming and outgoing light. The exactly impacted wavelength ranges are depending on the coating design but a typical case is that a dip around 490-500 nm (less visible in FIG. 3) and around 575-600 nm are created, for example.

However, the red and green primaries obtained in this way are still too broad to be DCI compliant. The colour points are not in the corresponding DCI tolerance boxes. An additional filtering in the green-red transition interval done with a notch filter is needed with the effect schematically represented in FIG. 4.

The wavelength interval between the green and red wavelengths (hence yellow wavelengths) where the imaging engine does the split-off between red and green results in a substantial amount of light loss.

The notch filter effect shown in FIG. 4 is just an example. In reality, the characteristics of the filter will have to be tailored to the exact phosphor spectrum and the exact specifications of the dichroic filters in the prism in order to correct the colour points of the primaries to be DCI compliant.

Due to the big difference between the optical spectrum of a Xenon lamp and a yellow phosphor, the light losses due to the use of a notch filter with a Xenon lamp are very different to that for a blue laser+yellow phosphor white source. In the case of the Xenon lamp this is typically 8% (in lumens). While in the case of blue laser+yellow phosphor white source this is approximately 18% (in lumens).

In addition to this significant decrease in brightness due to the notch filter for the specific case of a laser phosphor light source, another source of brightness reduction is the lack of red light and the excess of green light in the spectrum.

As a consequence, the major problem when using the blue laser+yellow phosphor architecture for a DCI compliant projector (in addition to the significant decrease in brightness due to the notch filter) is the lack of red light and the excess of green light in the typical spectrum of a yellow phosphor. Whereas this might not be a problem for projectors where the colour to white ratio is not a critical parameter, it's a major problem for DCI compliant projectors where the white color point (and therefore the red to white ratio) is very well defined in the DCI standard.

To solve this problem and bring the white color point at the DCI target value the excess of green light (and possibly blue also) has to be removed electronically. The same procedure is also used in current Xenon and Mercury lamp based projectors. But the losses due to these electronic corrections in the laser-phosphor based projectors are much higher than what is typically the case for a Xenon or Mercury lamp based projector. With typical values of 30% decrease in brightness due to the electronic correction, having a phosphor with such a limited red content proves to be a very serious issue.

To tackle the lack of red in the yellow phosphor spectrum, a solution typically called "red assisted laser phosphor source" has been proposed. In this case, an additional light source (direct red laser or red LEDs) is used to boost the red colour being produced. This additional light source is added to the existing blue laser+yellow phosphor solution without typically changing the type of phosphor that is used.

This is a very good solution in order to boost the red content and reduce the losses due to colour correction but it is still not minimizing the possible loses in brightness needed to achieve the DCI specification or other wide color gamut specifications or another standardized white point, or a combination of these.

SUMMARY OF THE INVENTION

An object of the present invention is to provide an optical subassembly for a projector designed to work, for example optionally with a red laser and a phosphor source with the advantage of reducing or minimizing the losses. Embodiments of the present invention reduce or minimize the losses of light which occur if a yellow phosphor is used for example. These losses can happen at different stages in the optical path such as in the Philips prism, due to electronic correction, due to a notch filter and/or any combination or all of these. Similar problems can occur with other color splitting and recombination engines for 3-chip projectors, DLP or also LCOS or LCD, for instance with a color splitting dichroic mirrors and a recombination X-cube.

Embodiments of the present invention provide the advantage of a smaller, more compact, less expensive projector with a lower need for cooling, specifically for a wide-gamut colour performance. Embodiments of the present invention are specifically suited for a specific standardized white color point such as a DCI white colour point.

An advantage of embodiments of the present invention is to match the color performance of the projection system to a color gamut target as given by DCI or larger with low or minimal light losses.

Embodiments of the present invention are particularly advantageous when implemented as a 3-chip projector architecture with a continuous white light illuminator, i.e. one illuminator per projector, but a combination of 2 or more is included within the scope of the present invention.

In one aspect the present invention provides a light projection system for generating an image with three primary colors, in particular, blue, green, and red, each primary color being respectively defined by a first, second and third wavebands, said light projection system comprising
a first blue laser source emitting a first beam in a fourth waveband, said first blue laser source having a first laser driver,
a second blue laser source emitting a second beam having a central wavelength and a fifth waveband, said second blue laser source having a second laser driver,
a substrate having a wavelength conversion element for emitting light at a plurality of wavelengths after absorption of a light beam at an excitation wavelength within a fifth waveband of the second blue laser source, said substrate being positioned in an optical path of said second beam such that light transmitted through or reflected from the wavelength conversion element results in emission of a converted beam having a waveband comprising at least the second and third wavebands,
a beam combiner for combining the first beam and the converted beam, which combination results in a white beam;
characterized in that the wavelength conversion element has
a centroid wavelength <560 nm and/or
GRTZC <16%.

For example light emitted by the wavelength conversion element preferably has
a green content >65%, wherein the green content is defined as a portion of light spectrum of the light emitted from the wavelength conversion element that goes into the green waveband, wherein the green waveband is in the range 495-575 nm,
and a Green-Red transition zone content (GRTZC), defined as $$GRTZC\ (\%) = \frac{\int_{575\ nm}^{600\ nm} S(\lambda)d\lambda}{\int_{400\ nm}^{800\ nm} S(\lambda)d\lambda} * 100,$$

is smaller than 16%.

Hence, the light from the wavelength conversion element can have a green content >65%. For example, the green content can be <75%, optionally <80%.

The fourth waveband is usually the same as the first waveband. The fifth waveband provides usually a majority of the light for the third waveband. Usually the first or third waveband is wider than the waveband of any individual laser source.

Blue or bluish light can be emitted from the wavelength conversion element in the waveband 480-500 nm. The blue laser can emit in the waveband 440-470 nm wavelength.

A red content of the light from the projection lens is preferably <30% and optionally >20%, the percentage values relating to relative energy contributions of the converted light from the wavelength conversion element in a certain wavelength range compared to the whole light spectrum from the wavelength conversion element which is taken as 100%.

A green light content is a portion of light spectrum of the light emitted from the wavelength conversion element that goes into the green waveband.

The green waveband can be in the range 495-575 nm.

GRTZC refers to light that desaturates colors and makes the color gamut smaller.

A third red laser source emitting a third beam in the third waveband, said third red laser source having a third laser driver. A red content in a light beam is the relative portion of the wavelength conversion element spectrum that goes into the third waveband.

The third waveband has light from the red laser, and an added amount of red or reddish light from the wavelength conversion element for de-speckling. An upper limit of the red or reddish light is reached if the color point of red moves to a smaller color gamut. The red or reddish light is orange light in the range 595-620 nm.

The Blue light content+Green light content+Red light content amounts to 100% for the light from the wavelength conversion element.

A notch filter can be provided to reduce light intensity of wavelengths in the waveband 570-600 nm. The notch filter can reduce light intensity in the range 10-15% or 10 to 20%.

At least one variable waveband reduction filter can be mounted on an actuator and provided in the optical path of the white beam, and wherein a movement of said variable waveband reduction filter between a first and a second position results in a change of the transmitted waveband of the white beam from a first to a second transmitted intensity, such as to adjust a projector white point.

The variable waveband reduction filter can be a first waveband reduction filter, a second waveband reduction filter or a third waveband reduction filter, such that it is configured to change the intensity of wavelengths comprised in the first, second or third wavebands respectively.

The notch filter and the variable waveband reduction filter can be combined in a combined variable filter. A first side of the variable filter can be coated with a narrow band notch filter and a second side of the filter can be coated with a variable waveband reduction filter. The variable second waveband reduction filter can be configured to reduce the intensity of wavelengths comprised in the range 510-570 nm. The actuator is preferably controlled by a processing unit. The actuator can comprise a rotation stage for rotating the variable second waveband reduction filter around the optical axis or at least one translation stage for moving said variable second waveband reduction filter in a direction perpendicular to the optical axis.

The variable second waveband reduction filter can comprise a coating provided with a pattern with an increased density of green-reducing patterns, the direction of density increase being adapted to the direction of movement of the actuator such that the intensity of the second green spectral band can be adjusted.

The variable second waveband reduction filter can comprise at least one of a rectangular continuous green reduction coating providing linear, adjustable attenuation within the coated region via translation, a filter with a rectangular reduction in step coating providing adjustable attenuation in steps within the coated region via translation, a round filter providing linear, adjustable attenuation within the coated region via rotation or a round filter providing linear attenuation in steps within the coated region via rotation of the filter.

The wavelength conversion element is a phosphor as phosphors have high power performance. The phosphor is of the type YAG:Ce if a yellow phosphor is desired. The phosphor can be of the type LUAG:Ce if a green phosphor is required.

The wavelength conversion element comprises quantum dots, e.g. for low power applications.

An optical monitoring unit can be provided for measuring the relative intensity of the first, second and third wavebands of the white beam. The optical monitoring unit can comprise at least one light sensor. The light sensor is preferably a multiband sensor or several individual sensors configured to measure the intensity of wavelengths comprised in the first, second and third wavebands. The multiband sensor is preferably configured to detect a or any difference in the light spectrum between a laser light and a converted beam. The optical monitoring unit can receive light by means of a foldable mirror placed in the optical path of the white beam, such that approximately 0.5% of the light is reflected to the light sensor.

The light sensor is at least one of a photodiode sensor, photoresistor, organic photoreceptor, spectrometer, photoamplifiers, CCD- or CMOS sensors and can include combination of these.

The projection system can further comprise a processing unit configured to communicate with the optical monitoring unit. For example, the foldable mirror can be configured to be retracted in and out from the white beam. The foldable mirror can be mounted on an actuator controlled by the processing unit.

Embodiments of the present invention can be implemented as a 3-chip projector.

The processing unit has local intelligence e.g. a microprocessor or an FPGA and can be configured to communicate with the optical monitoring unit for measuring the relative intensity of first, second and third wavelength bands of a white beam, said processing unit further configured to calculate a change in the drive levels of at least one of the first to third laser beams and the drive levels of the at least one variable waveband reduction filter according to the relative intensity of the first, second and third wavebands of the white beam to adjust a white point shift, and the first to third laser drivers being independently controlled so as to adjust the light intensity of each of a first and second blue laser sources independently of the light intensity of a red laser source.

The optical monitoring unit can be adapted to monitor different contributions in any, some or all wavebands. The optical monitoring unit can be adapted to monitor both the laser light and the wavelength conversion element light contribution in the blue waveband.

A variable blue and red reduction filter can be provided to increase the range of control available. The variable blue and red reduction filter can reduce further the red or reddish and blue or blueish light from the wavelength conversion element going into the red and blue channel. The blue and red reduction filter can comprise an actuator such that the amount of blue and red light transmitted by said filter can be adjusted by moving the position of said filter.

Each laser source can comprise an array of individual lasers, the intensity of each individual laser being controlled by its laser driver and wherein each laser is configured to be pulsed by its associated laser driver.

Beam homogenization optics can be provided.

Despeckling means can be provided.

The present application also provides an optical assembly for a light projection system for generating an image with three primary colors, in particular, blue, green, and red, each primary color being respectively defined by a first, second and third wavebands, the system having a first blue laser source emitting a first beam in a fourth waveband, said first blue laser source having a first laser driver, and a second blue laser source emitting a second beam having a central wavelength and a fifth waveband, said second blue laser source having a second laser driver, said assembly comprising a substrate having a wavelength conversion element for emitting light at a plurality of wavelengths after absorption of a light beam at an excitation wavelength within a fifth waveband of the second blue laser source, said substrate being positioned in an optical path of said second beam such that light transmitted through or reflected from the wavelength conversion element results in emission of a converted beam having a waveband comprising at least the second and third wavebands, a beam combiner for combining the first beam and the converted beam, which combination results in a white beam;

characterized in that the wavelength conversion element has a centroid wavelength <560 nm and/or

GRTZC <16%.

For example, light from the wavelength conversion element can have a green content >65%, wherein the green content is defined as a portion of light spectrum of the light emitted from the wavelength conversion element that goes into the green waveband, wherein the green waveband is in the range 495-575 nm, and a Green-Red transition zone content (GRTZC), defined as $$GRTZC\ (\%) = \frac{\int_{575\ nm}^{600\ nm} S(\lambda)d\lambda}{\int_{400\ nm}^{800\ nm} S(\lambda)d\lambda} * 100,$$

is smaller than 16%.

The optical assembly can have any of the features of the light projection system excluding the light sources.

The present invention also provides a method for generating an image with a light projection system with three primary colors, in particular, blue, green, and red, each primary color being respectively defined by a first, second and third waveband, the method comprising generating laser light from a first blue laser source emitting a first beam of the fourth waveband, said first blue laser source having a first laser driver, generating laser light from a second blue laser source emitting a second beam having a central wavelength and a waveband, said second blue laser source having a second laser driver, generating laser light from a third red laser source emitting a third beam of the third waveband, said third red laser source having a third laser driver, generating converted light from a substrate having a wavelength conversion element for emitting light at a plurality of wavelengths after absorption of a light beam at an excitation wavelength within the waveband of the second blue laser source, said substrate being positioned in an optical path of said second beam such that light transmitted through or reflected from the wavelength conversion element results in emission of a converted beam having a waveband comprising at least the second and third wavebands, combining the combined first and the converted beam, which combination results in a white beam;

wherein the wavelength conversion element has a centroid wavelength <560 nm and/or

GRTZC <16%.

For example light emitted from the wavelength conversion element can have:

a green content >65%, wherein the green content is defined as a portion of light spectrum of the light emitted from the wavelength conversion element that goes into the green waveband, wherein the green waveband is in the range 495-575 nm, and a Green-Red transition zone content (GRTZC), defined as $$GRTZC\ (\%) = \frac{\int_{575\ nm}^{600\ nm} S(\lambda)d\lambda}{\int_{400\ nm}^{800\ nm} S(\lambda)d\lambda} * 100,$$

is smaller than 16%.

The method can have further steps such as generating laser light from a third red laser source emitting a third beam of the third waveband, said third red laser source having a third laser driver, combining the white beam with the third beam which combination results in a white beam.

Hence, the wavelength conversion element can have a green content >65% and the green content can be <75%, optionally <80%.

The present invention in one aspect provides a light projection system for generating an image with three primary colors, in particular, blue, green, and red, each primary color being respectively defined by a first, second and third wavebands, said light projection system comprising a first blue laser source emitting a first beam in a fourth waveband, said first blue laser source having a first laser driver, a second blue laser source emitting a second beam having a central wavelength and a fifth waveband, said second blue laser source having a second laser driver, a substrate having a wavelength conversion element for emitting light at a plurality of wavelengths after absorption of a light beam at an excitation wavelength within a fifth waveband of the second blue laser source, said substrate being positioned in an optical path of said second beam such that light transmitted through or reflected from the wavelength conversion element results in emission of a converted beam having a waveband comprising at least the second and third wavebands, a beam combiner for combining the first beam and the converted beam, which combination results in a white beam;

characterized in that the projection system further comprises at least one variable waveband reduction filter mounted on an actuator and provided in the optical path of the white beam, and wherein a movement of said variable waveband reduction filter between a first and a second position results in a change of the transmitted waveband of the white beam from a first to a second transmitted intensity, such as to adjust a projector white point.

The variable waveband reduction filter can be a first waveband reduction filter, a second waveband reduction filter or a third waveband reduction filter, such that it is configured to change the intensity of wavelengths comprised in the first, second or third wavebands respectively.

A notch filter can be provided for reducing light intensity of wavelengths in the waveband 570-600 nm. The notch filter can be provided to reduce light intensity in the range 10-15% or 10 to 20%. The notch filter and the variable waveband reduction filter can be combined in a combined variable filter.

A first side of the variable filter can be coated with a narrow band notch filter and a second side of the filter can be coated with a variable waveband reduction filter. The variable second waveband reduction filter is configured to reduce the intensity of wavelengths comprised in the range 510-570 nm, and/or is able to be configured down to 35% of the initial light intensity.

The actuator can be controlled by a processing unit which provides local intelligence, arithmetic calculation ability and control functions that can be based on a model. The actuator comprises a rotation stage for rotating the variable second waveband reduction filter around the optical axis or at least one translation stage for moving said variable second waveband reduction filter in a direction perpendicular to the optical axis.

The variable second waveband reduction filter can comprise a coating provided with a pattern with an increased density of green-reducing patterns, the direction of density increase being adapted to the direction of movement of the actuator such that the intensity of the second green spectral band can be adjusted.

The variable second waveband reduction filter can comprise at least one of a rectangular continuous green reduction coating providing linear, adjustable attenuation within the coated region via translation, a filter with a rectangular reduction in step coating providing adjustable attenuation in steps within the coated region via translation, a round filter providing linear, adjustable attenuation within the coated region via rotation or a round filter providing linear attenuation in steps within the coated region via rotation of the filter.

A third red laser source emitting a third beam in the third waveband can be provided, said third red laser source having a third laser driver, said third beam being combined to the first beam and converted beam by the beam combiner.

The wavelength conversion element can emit light with
a centroid wavelength <560 nm and/or
GRTZC <16%.

Hence, the wavelength conversion element can emit light with a green content >65% and <75%, optionally <80%. Light emitted from the wavelength conversion element can have
a green content >65%, wherein the green content is defined as a portion of light spectrum of the light emitted from the wavelength conversion element that goes into the green waveband, wherein the green waveband is in the range 495-575 nm,
and a Green-Red transition zone content (GRTZC), defined as $$GRTZC\ (\%) = \frac{\int_{575\ nm}^{600\ nm} S(\lambda)d\lambda}{\int_{400\ nm}^{800\ nm} S(\lambda)d\lambda} * 100,$$

is smaller than 16%.

The first or third waveband is usually wider than the waveband of any individual laser source. The fourth waveband can be the same as the first waveband whereas as the fifth waveband can be different.

Blue or bluish light from the wavelength conversion element can be added in the waveband 480-500 nm. The blue laser can emit light in the waveband 440-470 nm wavelength.

A red content of the light beam is preferably <30% and optionally >20%, the percentage values relating to relative energy contributions of the converted light from the wavelength conversion element in a certain wavelength range compared to the whole light spectrum from the wavelength conversion element which is taken as 100%.

A green content is a portion of light spectrum of the light emitted from the wavelength conversion element that goes into the second waveband.

The second waveband can be in the range 495-575 nm.

The GRTZC refers to light that desaturates colors and makes the color gamut smaller.

A red content in a light beam is the relative portion of the wavelength conversion element spectrum that goes into the third waveband.

The third waveband (the red band) has light from the red laser, and an added amount of red or reddish light from the wavelength conversion element for de-speckling. An upper limit of the red or reddish light is reached if the color point of red moves to a smaller color gamut. The red or reddish light can be orange light in the range 595-620 nm.

The Blue light content+Green light content+Red light content amounts to 100% for the light from the wavelength conversion element. The wavelength conversion element is preferably a phosphor as phosphors have a high power rating. The phosphor can be of the type YAG:Ce, when a yellow phosphor is required. The phosphor can be of the type LUAG:Ce, when a green phosphor is required.

The wavelength conversion element can comprises quantum dots for low power applications.

An optical monitoring unit can be provided for measuring the relative intensity of the first, second and third wavebands of the white beam, e.g. with a sensor. Hence, the optical monitoring unit can comprise at least one light sensor. The light sensor is a multiband sensor configured to measure the intensity of wavelengths comprised in the first, second and third wavebands. The multiband sensor can be configured to detect a or any difference in the light spectrum between a laser light and a converted beam. The optical monitoring unit can receive light by means of a foldable mirror placed in the optical path of the white beam, such that approximately 0.5% of the light is reflected to the light sensor. The light sensor can be at least one of a photodiode sensor, photoresistor, organic photoreceptor, spectrometer, photoamplifiers, CCD- or CMOS sensors.

The projection system can further comprise a processing unit configured to communicate with the optical monitoring unit. A processing unit can include a processing engine such as a microprocessor or an FPGA.

The foldable mirror can be configured to be retracted in and out from the white beam. The foldable mirror can be mounted on an actuator controlled by the processing unit.

The light projection system is preferably implemented as a 3-chip projector architecture.

The processing unit can be configured to communicate with the optical monitoring unit for measuring the relative intensity of first, second and third wavelength bands of a white beam, said processing unit further configured to calculate a change in the drive levels of at least one of the first to third laser beams and the drive levels of the at least one variable waveband reduction filter according to the relative intensity of the first, second and third wavebands of the white beam to adjust a white point shift, and the first to third laser drivers being independently controlled so as to adjust the light intensity of each of a first and second blue laser sources independently of the light intensity of a red laser source.

The optical monitoring unit can be adapted to monitor different contributions in any, some or all wavebands. The optical monitoring unit can be adapted to monitor both the laser light and the wavelength conversion element light contribution in the blue waveband.

A variable blue and red reduction filter can be provided to reach more control. The variable blue and red reduction filter can further reduce the reddish and blueish light from the wavelength conversion element going into the red and blue channel. The blue and red reduction filter can comprise an actuator such that the amount of blue and red light transmitted by said filter can be adjusted by moving the position of said filter.

Each laser source can comprise an array of individual lasers, the intensity of each individual laser being controlled by its laser driver and wherein each laser is configured to be pulsed by its associated laser driver.

Beam homogenization optics can be provided. Despeckling means can be provided.

In another aspect the present invention provides an optical assembly for a light projection system for generating an image with three primary colors, in particular, blue, green, and red, each primary color being respectively defined by a first, second and third wavebands, the system having a first blue laser source emitting a first beam in a fourth waveband, said first blue laser source having a first laser driver, and a second blue laser source emitting a second beam having a central wavelength and a fifth waveband, said second blue laser source having a second laser driver, The optical assembly comprising
a substrate having a wavelength conversion element for emitting light at a plurality of wavelengths after absorption of a light beam at an excitation wavelength within a fifth waveband of the second blue laser source, said substrate being positioned in an optical path of said second beam such that light transmitted through or reflected from the wavelength conversion element results in emission of a converted beam having a waveband comprising at least the second and third wavebands,
a beam combiner for combining the first beam and the converted beam, which combination results in a white beam;
characterized in that the projection system further comprises at least one variable waveband reduction filter mounted on an actuator and provided in the optical path of the white beam, and wherein a movement of said variable waveband reduction filter between a first and a second position results in a change of the transmitted waveband of the white beam from a first to a second transmitted intensity, such as to adjust a projector white point.

In yet another aspect the present invention provides a method for generating an image with a light projection system with three primary colors, in particular, blue, green, and red, each primary color being respectively defined by a first, second and third waveband, the method comprising
generating laser light from a first blue laser source emitting a first beam of the fourth waveband, said first blue laser source having a first laser driver,
generating laser light from a second blue laser source emitting a second beam having a central wavelength and a waveband, said second blue laser source having a second laser driver,
generating converted light from a substrate having a wavelength conversion element for emitting light at a plurality of wavelengths after absorption of a light beam at an excitation wavelength within the waveband of the second blue laser source, said substrate being positioned in an optical path of said second beam such that light transmitted through or reflected from the wavelength conversion element results in emission of a converted beam having a waveband comprising at least the second and third wavebands,
combining the combined first and the converted beam, which combination results in a white beam;
wherein the method further comprises the steps of
moving at least one variable waveband reduction filter mounted on an actuator and provided in the optical path of the white beam, and wherein the movement of said variable waveband reduction filter between a first and a second position results in a change of the transmitted waveband of the white beam from a first to a second transmitted intensity, such as to adjust a projector white point.

An object of the present invention is to provide an optical subassembly for a projector designed to work with a red laser and a phosphor source with the advantage of reducing or minimizing the losses. Embodiments of the present invention reduce or minimize the losses of light which occur if a yellow phosphor is used for example. These losses can happen at different stages in the optical path such as in the Philips prism, due to electronic correction, due to a notch filter and/or any combination or all of these. Similar problems can occur with other color splitting and recombination engines for 3-chip projectors, DLP or also LCOS or LCD, for instance with a color splitting dichroic mirrors and a recombination X-cube.

Embodiments of the present invention provide the advantage of a smaller, more compact, less expensive projector with a lower need for cooling, specifically for a wide-gamut colour performance. Embodiments of the present invention are specifically suited for a specific standardized white color point such as a DCI white colour point.

An advantage of embodiments of the present invention is to match the color performance of the projection system to a color gamut target as given by DCI or larger with low or minimal light losses.

Embodiments of the present invention are particularly advantageous when implemented as a 3-chip projector architecture with a continuous white light illuminator, i.e. one illuminator per projector, but a combination of 2 or more is included within the scope of the present invention.

In a first aspect the present invention provides a light projection system for generating an image with three primary colors, in particular, blue, green, and red, each primary color being respectively defined by a first, second and third wavebands, said light projection system comprising
- a first blue laser source emitting a first beam in a fourth waveband, said first blue laser source having a first laser driver,
- a second blue laser source emitting a second beam having a central wavelength and a fifth waveband, said second blue laser source having a second laser driver,
- a substrate having a wavelength conversion element for emitting light at a plurality of wavelengths after absorption of a light beam at an excitation wavelength within a fifth waveband of the second blue laser source, said substrate being positioned in an optical path of said second beam such that light transmitted through or reflected from the wavelength conversion element results in emission of a converted beam having a waveband comprising at least the second and third wavebands,
- a beam combiner for combining the first beam and the converted beam, which combination results in a white beam;
characterized in that the projection system further comprises an optical monitoring unit for measuring the relative intensity of the first, second and third wavebands of the white beam.

The optical monitoring unit receives values from at least one light sensor. The monitoring unit has several advantages such as to assist in setting and adjusting white point, compensating for ageing etc.

The light sensor is preferably a multiband sensor or a plurality of sensors for different wavebands, the sensor being configured to measure the intensity of wavelengths comprised in the first, second and third wavebands. The multiband sensor is preferably configured to detect a or any difference in the light spectrum between a laser light and a converted beam.

The optical monitoring unit can receive light by means of a foldable mirror placed in the optical path of the white beam, such that approximately 0.5% of the light is reflected to the light sensor. The low level of light lost is an advantage. The light sensor can be at least one of a photodiode sensor, photoresistor, organic photoreceptor, spectrometer, photo-amplifiers, CCD- or CMOS sensors.

The projection system preferably comprises a processing unit configured to communicate with the optical monitoring unit. The processing unit has a processing engine such as a microprocessor or a FPGA and hence is able to arithmetic calculations.

Preferably, the foldable mirror is configured to be retracted in and out from the white beam, and preferably the foldable mirror is mounted on an actuator controlled by the processing unit.

The wavelength conversion element emits light at
- a centroid wavelength <560 nm and/or
- a GRTZC <16%.

Hence, light emitted from the wavelength conversion element can have a green content >65% such as <75%, optionally <80%. Light emitted from the wavelength conversion element can have:
- a green content >65%, wherein the green content is defined as a portion of light spectrum of the light emitted from the wavelength conversion element that goes into the green waveband, wherein the green waveband is in the range 495-575 nm, and a Green-Red transition zone content (GRTZC), defined as $$GRTZC\ (\%) = \frac{\int_{575\ nm}^{600\ nm} S(\lambda)d\lambda}{\int_{400\ nm}^{800\ nm} S(\lambda)d\lambda} * 100,$$

is smaller than 16%.

It can be advantageous to have a third red laser source emitting a third beam in the third waveband, said third red laser source having a third laser driver as this gives more control over the color gamut.

The present invention is very suitable for a 3-chip projector architecture.

The first or third waveband is wider than the waveband of any individual laser source as the lasers have a narrow bandwidth.

Blue or bluish light can be emitted from the wavelength conversion element in the waveband 480-500 nm, and the blue laser can be in the waveband 440-470 nm wavelength.

A red content is preferably <30% and optionally >20%, the percentage values relating to relative energy contributions of the converted light from the wavelength conversion element in a certain wavelength range compared to the whole light spectrum from the wavelength conversion element which is taken as 100%. A green content is a portion of light spectrum of the light emitted from the wavelength conversion element that goes into the green waveband.

The third, green waveband can be in the range 495-575 nm.

The GRTZC refers to light that desaturates colors and makes the color gamut smaller.

A red content in a light beam is the relative portion of the wavelength conversion element spectrum that goes into the red waveband. The red waveband has light from the red laser, and an added amount of red or reddish light from the wavelength conversion element for de-speckling, an upper limit of the reddish light being reached if the color point of red moves to a smaller color gamut.

The red or reddish light can be orange light in the range 595-620 nm.

The Blue light content+Green light content+Red light content amounts to 100% of the light from the wavelength conversion element.

A notch filter can be provided for reducing light intensity of wavelengths in the waveband 570-600 nm. The notch filter (370) can be selected to reduce light intensity in the range 10-15% or 10 to 20%.

At least one variable waveband reduction filter mounted on an actuator can be provided in the optical path of the white beam, and wherein a movement of said variable waveband reduction filter between a first and a second position results in a change of the transmitted waveband of the white beam from a first to a second transmitted intensity, such as to adjust a projector white point.

The variable waveband reduction filter can be a first waveband reduction filter, a second waveband reduction filter or a third waveband reduction filter, such that it is configured to change the intensity of wavelengths comprised in the first, second or third wavebands respectively.

The or any notch filter and the variable waveband reduction filter can be combined in a combined variable filter.

A first side of the variable filter can be coated with a narrow band notch filter and a second side of the filter can be coated with a variable waveband reduction filter.

The variable second waveband reduction filter can be configured to reduce the intensity of wavelengths comprised in the range 510-570 nm.

The actuator can be controlled by the processing unit. The actuator can comprise a rotation stage for rotating the variable second waveband reduction filter around the optical axis or at least one translation stage for moving said variable second waveband reduction filter in a direction perpendicular to the optical axis.

The variable second waveband reduction filter can comprise a coating provided with a pattern with an increased density of green-reducing patterns, the direction of density increase being adapted to the direction of movement of the actuator such that the intensity of the second green spectral band can be adjusted.

The variable second waveband reduction filter can comprise at least one of a rectangular continuous green reduction coating providing linear, adjustable attenuation within the coated region via translation, a filter with a rectangular reduction in step coating providing adjustable attenuation in steps within the coated region via translation, a round filter providing linear, adjustable attenuation within the coated region via rotation or a round filter providing linear attenuation in steps within the coated region via rotation of the filter.

The wavelength conversion element is a phosphor as phosphors have a high power rating, e.g. can work at 50 W/mm$^2$. For example the phosphor can be of the type YAG:Ce for a yellow phosphor. Alternatively, the phosphor can be of the type LUAG:Ce for a green phosphor. For lower power ratings, for example, Quantum Dots can be used for the wavelength conversion element.

The processing unit is preferably configured to communicate with the optical monitoring unit for measuring the relative intensity of first, second and third wavelength bands of a white beam, said processing unit further configured to calculate a change in the drive levels of at least one of the first to third laser beams and the drive levels of the at least one variable waveband reduction filter according to the relative intensity of the first, second and third wavebands of the white beam to adjust a white point shift, and the first to third laser drivers being independently controlled so as to adjust the light intensity of each of a first and second blue laser sources independently of the light intensity of a red laser source.

The optical monitoring unit is preferably adapted to monitor different contributions in any, some or all wavebands. The optical monitoring unit can be adapted to monitor both the laser light and the wavelength conversion element light contribution in the blue waveband.

A variable blue and red reduction filter can provide yet further adaptability. The variable blue and red reduction filter further reduces the reddish and blueish light from the wavelength conversion element going into the red and blue channel. The blue and red reduction filter can comprise an actuator such that the amount of blue and red light transmitted by said filter can be adjusted by moving the position of said filter.

Each laser source comprises an array of individual lasers, the intensity of each individual laser being controlled by its laser driver and wherein each laser is configured to be pulsed by its associated laser driver.

Beam homogenization optics can be provided as can despeckling means.

The present invention also provides an optical assembly for a light projection system for generating an image with three primary colors, in particular, blue, green, and red, each primary color being respectively defined by a first, second and third wavebands, the optical assembly for use with a first blue laser source emitting a first beam in a fourth waveband, said first blue laser source having a first laser driver, a second blue laser source emitting a second beam having a central wavelength and a fifth waveband, said second blue laser source having a second laser driver, said assembly comprising, a substrate having a wavelength conversion element for emitting light at a plurality of wavelengths after absorption of a light beam at an excitation wavelength within the fifth waveband of the second blue laser source, said substrate being positioned in an optical path of said second beam such that light transmitted through or reflected from the wavelength conversion element results in emission of a converted beam having a waveband comprising at least the second and third wavebands, a beam combiner for combining the first beam and the converted beam, which combination results in a white beam;

characterized in that the optical assembly further comprises an optical monitoring unit for measuring the relative intensity of the first, second and third wavebands of the white beam.

Laser light from a third red laser source can be provided to emit a third beam of the third waveband, said third red laser source having a third laser driver.

The present invention provides of a method for generating an image with a light projection system with three primary colors, in particular, blue, green, and red, each primary color being respectively defined by a first, second and third waveband, the method comprising generating laser light from a first blue laser source emitting a first beam of a fourth waveband, said first blue laser source having a first laser driver, generating laser light from a second blue laser source emitting a second beam having a central wavelength and a fifth waveband, said second blue laser source having a second laser driver, generating a converted light beam from a substrate having a wavelength conversion element emitting light at a plurality of wavelengths after absorption of a light beam at an excitation wavelength within the fifth waveband of the second blue laser source, said substrate being positioned in an optical path of said second beam such that light transmitted through or reflected from the wavelength conversion element results in emission of a converted beam having a waveband comprising at least the second and third wavebands, combining the combined first and third beam, and the converted beam, which combination results in a white beam;

characterized by measuring the relative intensity of the first, second and third wavebands of the white beam.

Laser light can be generated from a third red laser source emitting a third beam of the third waveband, said third red laser source having a third laser driver.

Any of the laser sources can be multiple individual lasers combined together and they and they can be driven by groups of laser drivers so that, for example each laser driver can drive a several laser.

The second blue laser source can be a UV or a near-UV laser source and, hence, be in the UV or near-UV wavelength ranges. This laser light is converted by the wavelength conversion element, so the specific wavelength range of the excitation light is not so important. Blue lasers of 440-470 nm wavelength are an economical choice at present.

BRIEF DESCRIPTION OF THE DRAWINGS

FIG. 18 shows an example of the sensitivity ranges of the multi-band sensor as described with reference to FIG. 17 in accordance with an embodiment of the present invention.

FIGS. 19 a to 19 e illustrate different embodiments of a variable waveband reduction filter.

DEFINITIONS

Figure 1:
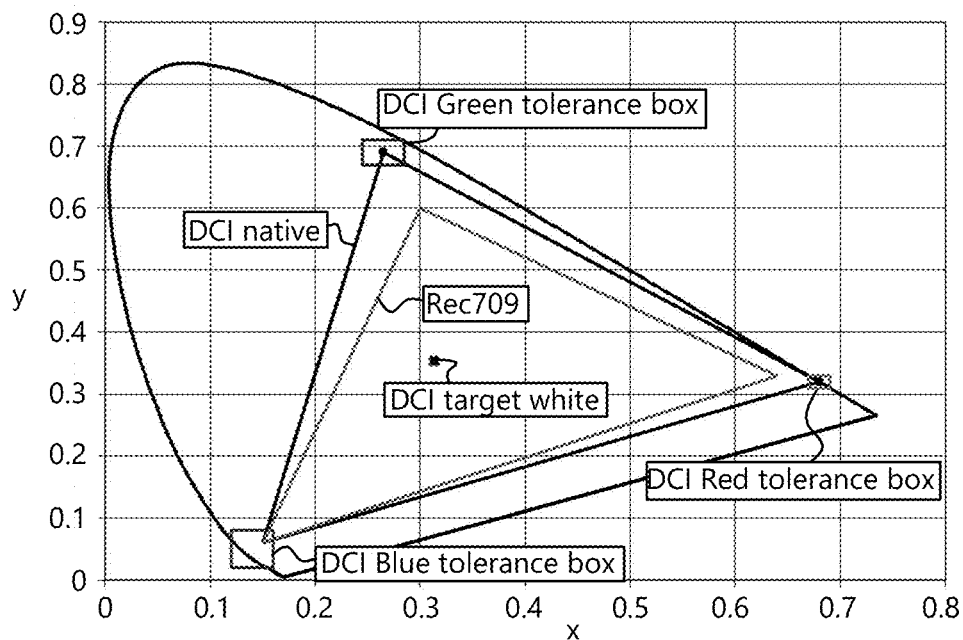
FIG. 1 presents a comparison between the REC709 colour gamut and the DCI colour gamut.
Figure 2:
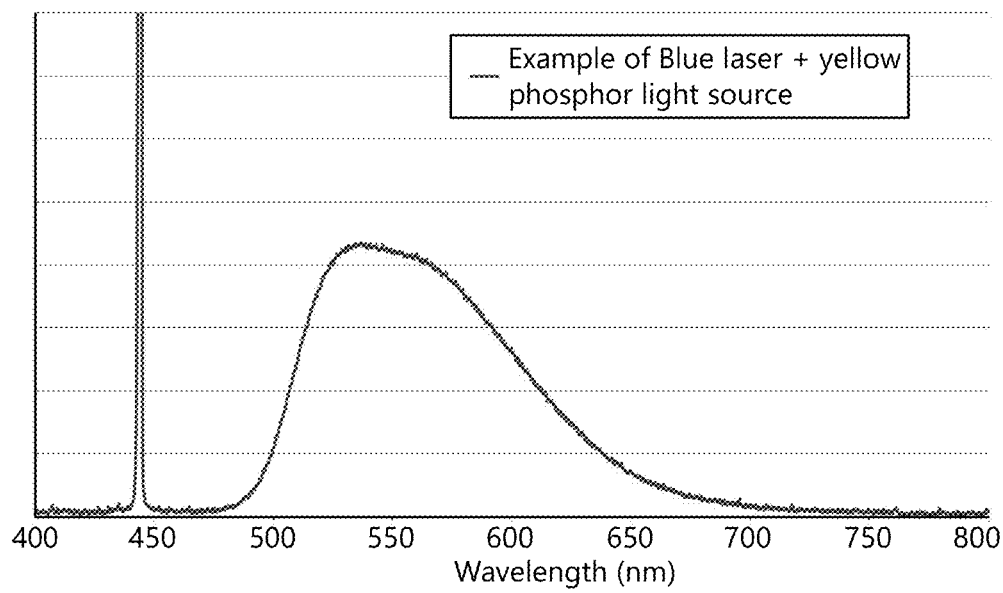
FIG. 2 presents a known optical spectrum of a white illumination source consisting of direct blue lasers and yellow phosphor.

In this description, a distinction is made between the primary colors of a standard color gamut like REC 709 and a wider color gamut like DCI. DCI is only one example of a wider color gamut however. The embodiments of the present invention can be used for other wide color gamuts, for instance for a new and changed DCI color gamut, or in another example to color gamuts that move closer to Rec 2020, which is in itself apparently unreachable in its strict definition because it requires monochromatic primaries only possible with only lasers in every primary color at this moment.

In a projection system, the definition of a primary color is complex as it depends where the primary color is defined in the optical path, i.e. in each color channel, at the level of the light modulator devices, upstream of the light modulator devices, or at the output of the projector. It is very often that in projection systems the three primary colors are red, green and blue.

In optical terms, a primary color is defined as "One color element of three colors, in an additive imaging system, which can be combined in various proportions to produce any other color." Each primary color is further determined e.g. according to a standard, for example DCI standard, by a waveband range.

It is important to note that a primary color is also defined in a standard via its color coordinates. A certain waveband and a certain spectral distribution inside this waveband may create a certain set of color coordinates that is equal to the one defined in a standard. For instance the set can include two color coordinates like (x,y), that determine the color point.

However, different solutions exist with differences in waveband and spectral distributions that can create the same color coordinates sometime called "metamerism".

White point is defined as, in additive imaging systems, as "the color (or chromaticity coordinates and luminance) that is produced when the system is sent the maximum RGB code values that it can accept", as defined in Color and Mastering for Digital Cinema by Glenn Kennel, 2006, ISBN-10: 0240808746. Further, the text book specifies that "DCI specifications and SMPTE Standard for Screen Luminance and Chromaticity, the white point is defined as having chromaticity coordinates [0.314 0.351]. However, this definition of white point is optional, and further the definition used depends on the standard followed.

The definition of white point depends on the application. Therefore, we distinguish the projector white point (or native white point), and the target white point. We define projector white point (native white point) as the white point when all three color channels provide their maximum level. The target white point is the standard the projector should reach.

The white point shifts as the drift of the projector white point with time or with dimming of the illumination levels.

In a similar manner, we define target primary colors as the primary colors defined by the standard, i.e. DCI standard, and the projector primary colors (or native primary colors) as the primary colors provided to each color channel or light modulator device. Native primary colors therefore have no electronic correction.

It is clear that the projector primary color define the projector white point, however, the target primary colors do not necessarily define the target white point. A spectral centroid is a measure used in digital signal processing to characterise a spectrum. It indicates where the "center of mass" of the spectrum is It is calculated as the weighted mean of the frequencies present in the signal, determined using a Fourier transform, with their magnitudes as the weights.

Centroid wavelength is different than the peak wavelength, especially as phosphor spectra are often asymmetric around the peak with a longer tail in higher wavelengths.

The centroid is more useful than the peak as the green waveband channel takes a certain broad interval of the phosphor spectrum, so the realized "dominant wavelength", determining the relevant color point i.e. for DCI-compliance, should be more linked to the centroid wavelength than to the peak wavelength.

The centroid of a phosphor spectrum is accurate to predict how color point would move on a CIE color diagram and if it exceeds i.e. the DCI point. And in general, green phosphors are better than this than yellow phosphors because of the lower centroid wavelength.

The following terms, "Central Wavelength" or "Center Wavelength (CWL)" is the midpoint between the wavelengths where transmittance is 50% of the specified minimum transmission, referred to as the Full Width at Half Maximum (FWHM).

A "wavelength conversion element" receives light from a light source such as a blue laser and emits light at different wavelengths. Such elements can be made with a phosphor, with quantum dots, or fluorescent dyes. Quantum dots plates/films can sustain around 5 W/cm$^2$ laser power illumination.

The term "phosphor" used throughout the description refers to a phosphorescent material used as a wavelength conversion element.

Quantum Dots are preferably cooled, e.g. by a fluid such as air or a liquid. Quantum dots can emit in a substantially smaller band than phosphors. This enables 3D projectors, for example. For example, one can use "6P" small band quantum dots, e.g. with 100% green content". However even with such Quantum Dots it can be important to set or adjust white point and to use a multiband sensor with a monitoring and controller and/or processing unit.

Embodiments of the present invention provide a laser+ wavelength convertor being phosphor or something else with the condition that the emitting spectrum of the wavelength convertor is the same as the one specify in the patent.

Color Tuning in embodiments of the present invention involves removing excess green light which is generated by a blue laser and yellow phosphor illuminator before that light goes into the engine, for better cooling, and less loss of contrast ratio and bit levels. A yellow notch filter can be needed to make a white color gamut like DCI color gamut.

Green wavelength conversion elements such as based on a phosphor, provided an illuminator immediately with a wide color gamut like DCI and with a balanced white point like the DCI white point by foreseeing the correct laser powers. This has the same advantages as the Color Tuning with the addition that it is more efficient.

Extension of both these concepts to multichannel projectors provides an advantage that illuminator alignment of the white point for instance, can be performed.

DETAILED DESCRIPTION OF THE INVENTION

Embodiments of the present invention aim to match the color performance of a projection system to a color gamut target as given by DCI or larger with low or minimal light losses.

In one embodiment, a laser phosphor light source is proposed for a 3-chip projector consisting of, or comprising:
One or more direct blue lasers
One or more blue lasers including optionally UV or ultra UV laser to excite a green wavelength conversion element such as a green phosphor
One or more optional direct red lasers
One or more beam combiners to combine the different color contributions to a white light beam that is provided to an imaging engine.
Optionally at least one primary moveable waveband reduction filter, preferably blue or red.

In another embodiment according to the present invention, a laser phosphor is proposed for a 3-chip projector, comprising of
One or more direct blue lasers
One or more blue lasers including optionally UV or ultra UV laser to excite a wavelength conversion element such as phosphor for generating a light beam having a waveband conversion element which includes at least one primary color, such as a yellow phosphor
Optionally one or more direct red lasers
One or more beam combiners to combine the different color contributions to a white light beam that is provided to an imaging engine
Optionally, at least one primary moveable color waveband reduction filter, in particular green, blue or red.

This second embodiment will be described after the description of the first embodiment.

Figure 5:
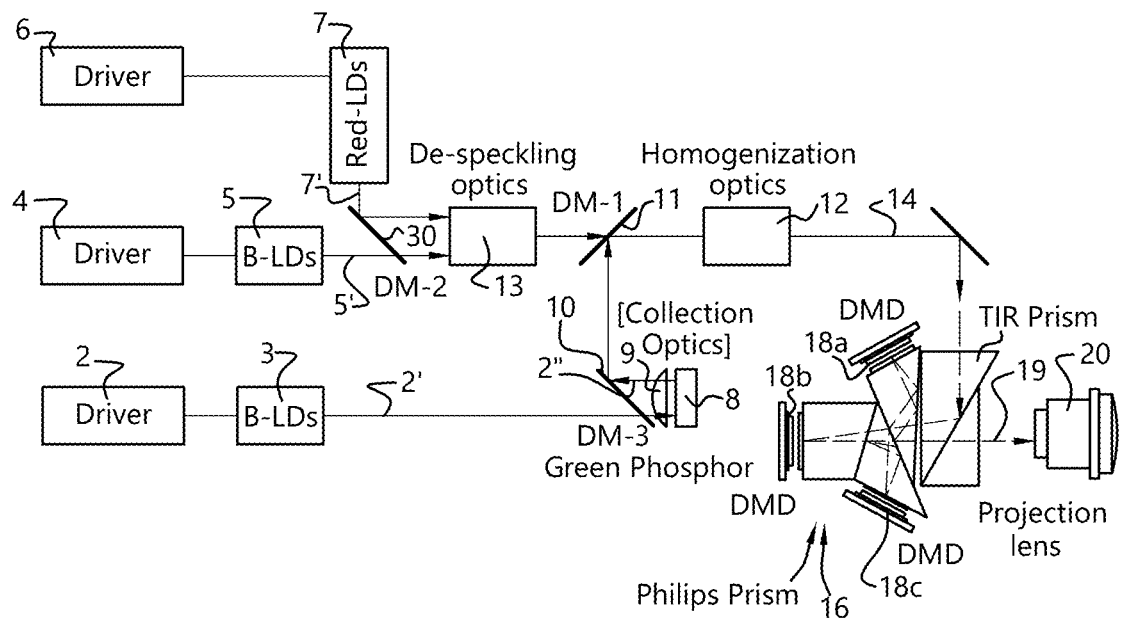
FIG. 5 illustrates an embodiment according to the present invention of optical subassemblies and a light source integrated in a projector.
Figure 6:
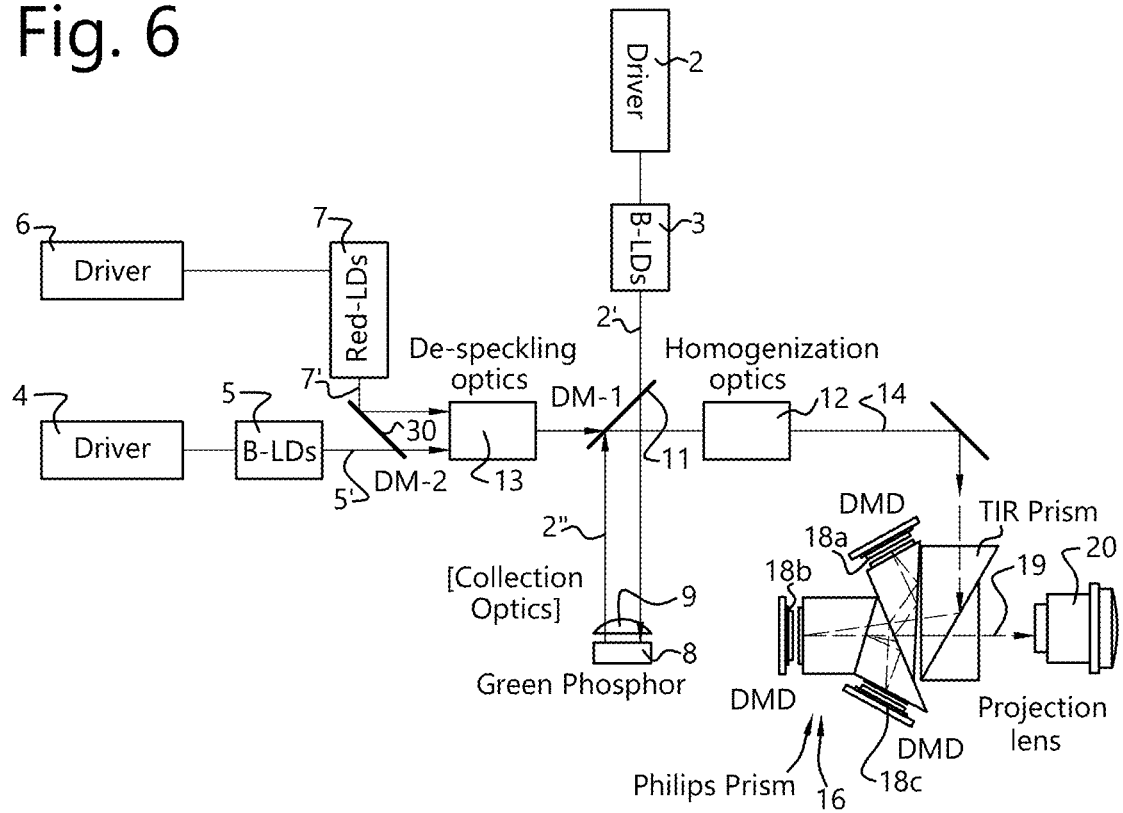
FIG. 6 illustrates an embodiment according to the present invention of optical subassemblies and a light source integrated in a projector.

FIGS. 5 and 6 illustrate two embodiments according to the present invention of optical subassemblies and a light source integrated in a projector, using dichroic mirror components as beam combiners in the illumination source whereby other examples of similar arrangements can be understood by the skilled person.

FIG. 5 shows drivers 2, 4, 6 provided for a blue laser 3, a blue laser 5, and red laser 7 respectively. Any laser can be made of a group of lasers of which the beams are combined into one exit beam. The blue laser 2 emits light 2' in the wavelength range 440 to 470 nm incident on a wavelength conversion element 8, either in transmission (not shown) or reflection. For the wavelength conversion element excitation, this range can be extended to include UV-wavelength ranges. The red laser can emit in the range 630 to 650 nm although longer wavelengths are also suitable. Optionally, collection optics 9 are provided for collecting the emitted wavelength conversion element light, e.g. phosphor light. The wavelength conversion element 8 can be a green phosphor as described below. The wave converted light beam 2" emitted from the wavelength conversion element 8 is directed, e.g. by means of dichroic mirrors 10 and 11 to homogenization optics 12 which serves to create a uniform rectangular white beam with a certain half cone angle that is imaged on the one or more light valves in the imager engine. Examples of homogenization optics are sets of fly-eye lenses, or also lightrods. Blue laser 5 and red laser 7 emit beams 5' and 7' which are directed to despeckling optics 13 via a dichroic mirror 30. The combined beams 5' and 7' are directed to the homogenization optics 12, e.g. via dichroic mirror 11. The output of the homogenization optics 12 is a white beam 14 which is incident upon an imaging engine including a TIR prism and Philips prism structure, 16 for example, which splits the white light into three primary colours such as red green and blue beams which are each incident upon a light valve 18a, 18b, 18C such as a DMD. Reflected light from the DMD's which is modulated in accordance with an image such as a video is reformed by the TIR prism and Philips prism structure 16 to form the projection beam 19 which is directed through a projection lens 20.

FIG. 6 shows a further embodiment having drivers 2, 4, 6 provided for a blue laser 3, a blue laser 5, and red laser 7 respectively. The red laser can emit in the range 630 to 650 nm although longer wavelengths are also suitable. The blue laser 2 emits light 2' in the wavelength range 440-470 nm incident on a wavelength conversion element 8, either in transmission (not shown) or reflection. For the wavelength conversion element excitation this range can be extended to include UV-wavelength ranges. Optionally collection optics 9 are provided for collecting the emitted wavelength conversion element light, e.g. phosphor light. The wavelength conversion element 8 can be a green phosphor as described below. The wave converted light beam 2" emitted from the wavelength conversion element 8 is directed, e.g. by means of dichroic mirrors 9 and 11 to homogenization optics 12 which serves to create a uniform rectangular white beam with a certain half cone angle that is imaged on the one or more light valves in the imager engine. Examples of homogenization optics are sets of fly-eye lenses, or also light rods. Blue laser 5 in the wavelength range 440 to 470 nm and red laser 7 in the wavelength range 630 to 650 nm emit beams 5' and 7' which are directed to despeckling optics 13 via a dichroic mirror 9. The combined beams 5' and 7' are directed to the homogenization optics 12, e.g. via dichroic mirror 11. The output of the homogenization optics 12 is a white beam 14 which is incident upon an imaging engine including a TIR prism and Philips prism structure, 16 for example, which splits the white light into three primary colours such as red green and blue beams which are each incident upon a light valve 18a, 18b, 18c such as a DMD. Reflected light from the DMD's which is modulated in accordance with an image such as a video is reformed by the TIR prism and Philips prism structure 16 to form the projection beam 19 which is directed through a projection lens 20.

Note that in FIGS. 5 and 6 there is no additional notch filter shown in or in the neighborhood of the imaging engine, because it is one of the purposes of embodiments this invention to minimize the losses by avoiding the presence of a notch filter in case of DCI compliance. A notch filter may however be used in some embodiments although less preferred.

In case of even wider color gamut requirements however, the additional notch filter can still be introduced, for instance at the entrance of the TIR and Philips prism structure, however again with lower filtering losses than for the prior art case.

The first step of which can be used with any of the embodiments of the present invention such as shown in FIGS. 5 and 6 is to use a phosphor with a specific spectrum, different to the so-called yellow phosphor spectrum, like from a YAG:Ce phosphor, in combination with direct blue lasers and direct red lasers in order to reduce the light losses to minimum. The spectral power distribution of the light emitted by the phosphor under 440-470 nm excitation from the blue laser 2 of FIG. 5 or 6 has a peak wavelength shifted to lower wavelengths in comparison with what is typically named "yellow phosphor" and was described with respect to the prior art. As it has the peak wavelength shifted to lower wavelengths this type of phosphor will be named a "green phosphor".

A suitable "green phosphor" for reducing or minimizing losses in embodiments of the present invention such as an illumination system as described above with respect to FIG. 5 or 6, has to accomplish the following conditions with regard to its spectrum:

Centroid wavelength <560 nm and/or
Green content >65% and/or
GRTZC <16%

Light emitted from the wavelength conversion element can have:

a green content >65%, wherein the green content is defined as a portion of light spectrum of the light emitted from the wavelength conversion element that goes into the green waveband, wherein the green waveband is in the range 495-575 nm, and a Green-Red transition zone content (GRTZC), defined as $$GRTZC\ (\%) = \frac{\int_{575\ nm}^{600\ nm} S(\lambda)d\lambda}{\int_{400\ nm}^{800\ nm} S(\lambda)d\lambda} * 100,$$

is smaller than 16%.

The first waveband can be—optionally—wider than the waveband of any individual laser source. Moreover, embodiments of the present invention allow adding bluish light from a wavelength conversion element such as a phosphor or quantum dots which allows a wider waveband. Such a waveband can be 480-500 nm for example. A number of laser wavelengths can be combined when an array of lasers is used. Secondly, cyanish phosphor light 480-500 nm can be added.

Examples of suitable green phosphors meeting the requirements described here above comprise:

LuAG:Ce type phosphors such as:
the Lu3Al5O12:Ce from the paper below: http://www.chemistryviews.org/details/ezine/7897011/The_Future_of_Lighting.html The article has the following references: DOI: 10.1002/chemv.201500033, Author: Jörg Meyer, Frank Tappe, Nico Schmidt, Published Date: 05 mai 2015, Copyright: Wiley-VCH Verlag GmbH & Co. KGaA, Weinheim.

The GNYAG3557 from Intematix portfolio http://www.intematix.com/uploads/Phosphor%20Family%20Sheets/NYAGSingleSheet.pdf The following three tables show various phosphors from Intematix NYAG Phosphor Product Line from the webpage cited here above as of the priority date.

Large Particle NYAGs for High Power LEDs

TABLE 1

| Product | Peak Wavelength λ (nm) | Color Point CIEx | CIEy | Particle Size D50V (mm) |
|---|---|---|---|---|
| NYAG4056-01-13 | 542 | 0.403 | 0.559 | 13.5 |
| NYAG4156-L | 543 | 0.400 | 0.560 | 11 |
| NYAG4255-01-13 | 545 | 0.418 | 0.554 | 13 |
| NYAG4355-L | 551 | 0.426 | 0.548 | 13.5 |
| NYAG4354 | 554 | 0.433 | 0.543 | 13 |
| NYAG4454-L | 558 | 0.444 | 0.536 | 13.5 |
| NYAG4454-EL | 560 | 0.448 | 0.533 | 14 |
| NYAG4653-L | 563 | 0.458 | 0.526 | 12.5 |
| NYAG4752-L | 566 | 0.465 | 0.521 | 13 |

Small Particle NYAGs for Small Packages or Conformal Deposition

TABLE 2

| Product | Peak Wavelength λ (nm) | Color Point CIEx | Color Point CIEy | Particle Size D50V (mm) |
|---|---|---|---|---|
| NYAG3757-01-08 | 538 | 0.368 | 0.567 | 8 |
| NYAG4156-S | 544 | 0.403 | 0.558 | 8 |
| NYAG4255-01-B08 | 545 | 0.417 | 0.554 | 8.5 |
| NYAG4355-01-B08 | 550 | 0.426 | 0.548 | 8.5 |
| NYAG4355-ES | 551 | 0.425 | 0.548 | 6 |
| NYAG4454-03-B08 | 558 | 0.444 | 0.536 | 8.5 |
| NYAG4653-S | 562 | 0.458 | 0.526 | 8 |

Green NYAG for 80 CRI Lighting

TABLE 3

| Product | Peak Wavelength λ (nm) | Color Point CIEx | Color Point CIEy | Particle Size D50V (mm) |
|---|---|---|---|---|
| GNYAG3557-01-11 | 526 | 0.345 | 0.569 | 11 |
| GNYAG3657-01-11 | 531 | 0.361 | 0.568 | 11 |
| GNYAG3757-01-11 | 534 | 0.371 | 0.566 | 11 |
| GNYAG3856-01-13 | 538 | 0.380 | 0.564 | 13 |
| GNYAG3956-01-11 | 540 | 0.394 | 0.562 | 11 |
| GNYAG4056-01-11 | 543 | 0.403 | 0.558 | 11 |

The second blue laser source can also be in the UV or near-UV wavelength ranges. This laser light is converted by the wavelength conversion element, so the specific wavelength range of the excitation light is not so important. Blue lasers of 440-470 nm wavelength are an economical choice at present.

The red content is preferably <30% and optionally >20%.

The percentage values relate to relative energy contributions of the phosphor converted light in a certain wavelength range compared to the whole phosphor light spectrum which is taken as 100%.

The green content is the part of the wavelength conversion element light spectrum, e.g. phosphor or quantum dots light spectrum for use in the green waveband, hence this is preferably a significant percentage such as >65%. A larger amount means a higher light output at the end. The green waveband is optionally 495-575 nm as an example. This light is primarily intended to be modulated by the light valve in the green color channel GRTZC is the "Green-Red Transition Zone Content", which is light of a wavelength range of which a lot of losses occur in the Philips prism and/or any additional notch filter. This light does not belong very well to neither the green nor red waveband because it typically desaturates the colors and makes the color gamut smaller. Embodiments of the present invention use a green wavelength conversion element such as a green phosphor or green quantum dots in such a way that there is less amount of this kind of light than for the prior art yellow phosphor.

Red Content is the relative portion of the wavelength conversion element spectrum such as a green phosphor or green quantum dots of light that goes into the red waveband. The red waveband is mostly served by the direct red lasers, and it is preferred to add an amount of reddish light from the wavelength conversion element such as a phosphor or quantum dots for de-speckling reasons. An upper limit of this type of reddish light occurs if the color point of red moves to a too small color gamut, e.g. if it is mainly orange light around 600 nm. Hence it is preferred if the red content is kept within such an upper limit. A suitable lower limit would be de-speckle related but may be of minor relevance when a red laser de-speckling process is used. Hence the >20% condition is optional.

It should be observed that Blue Content+Green Content+Red Content amounts to 100% for the wavelength conversion element such as a phosphor or quantum dots used.

Accordingly, the spectrum of the wavelength conversion element has light mainly in the green channel, and preferably only a small fraction goes to red and blue channels for limited color tuning and laser de-speckling.

Additionally, especially when the beam combining in the illumination engine is performed using a dichroic mirror based system (as shown in the embodiments of FIGS. 5 and 6 above), it is also beneficially to add the following criterion:
Red content <30%

Where the parameters used to describe the green phosphor are defined as:

Centroid wavelength is the wavelength that divides the integral of a spectrum (S(λ) being the spectral power distribution) into two equal parts according to the following formula:

$$\lambda_c = \frac{\int_{\lambda 2}^{\lambda 2} \lambda S(\lambda) d\lambda}{\int_{\lambda 1}^{\lambda 2} S(\lambda) d\lambda}$$

Green content is defined as $$\text{Green (\%)} = \frac{\int_{495\,nm}^{575\,nm} S(\lambda) d\lambda}{\int_{400\,nm}^{800\,nm} S(\lambda) d\lambda} * 100$$

Red content is defined as $$\text{Red (\%)} = \frac{\int_{575\,nm}^{800\,nm} S(\lambda) d\lambda}{\int_{400\,nm}^{800\,nm} S(\lambda) d\lambda} * 100$$

Blue content is defined as $$\text{Blue (\%)} = \frac{\int_{400\,nm}^{495\,nm} S(\lambda) d\lambda}{\int_{400\,nm}^{800\,nm} S(\lambda) d\lambda} * 100$$

Green-Red transition zone content (GRTZC) is defined as $$\text{GRTZC (\%)} = \frac{\int_{575\,nm}^{600\,nm} S(\lambda) d\lambda}{\int_{400\,nm}^{800\,nm} S(\lambda) d\lambda} * 100$$

In above descriptions, S(λ) represent the spectrum of the wavelength converted light from the wavelength conversion elements such as a phosphor, which is integrated within the specified boundaries in the integrals above. Note that the spectral integration intervals as noted on the integral boundary values are 575-600 nm for GRTZC.

The wavelength intervals used in the previous formulas are based on typical half wavelength values for dichroic coatings in the Philips prism.

Peak wavelength is the wavelength at the maximum intensity of the spectrum. This most often used as a parameter in phosphor data sheets because it is very easy to be determined from the spectral power distribution. However it has little significance for practical purposes because two phosphors with exactly the same peak wavelength might have completely different color perception. It is preferred to use centroid wavelength and blue, green and red content in order to describe more precisely the spectral characteristics of a phosphor.

Figure 7:
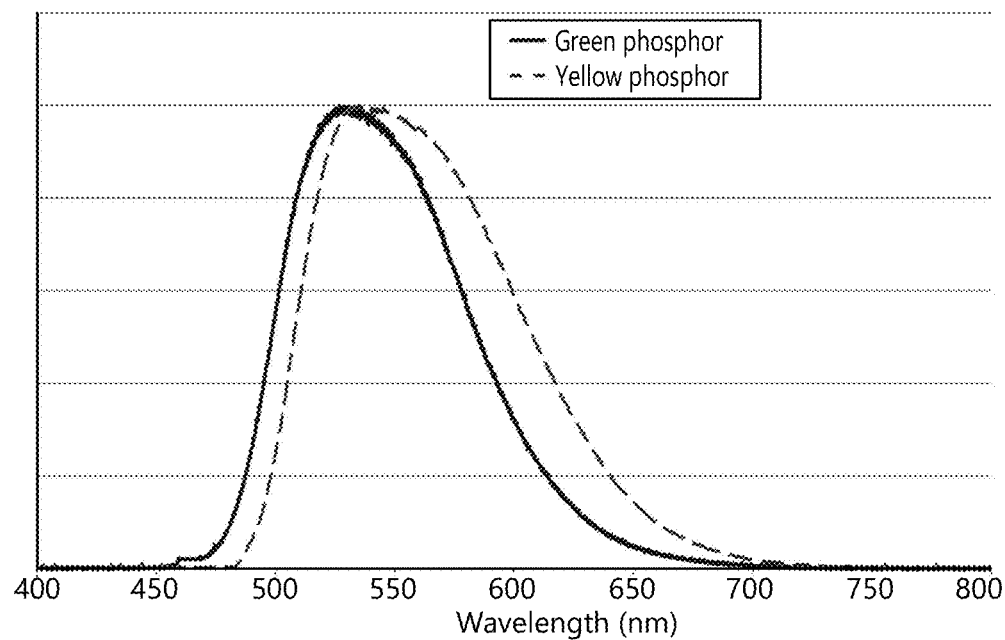
FIG. 7 shows a comparison between the optical spectrum of a typical green phosphor used in embodiments of the present invention as shown in FIGS. 5 and 6 and a typical yellow phosphor.

A comparison between the optical spectrum of a typical green phosphor and a typical yellow phosphor used in embodiments of the present invention having 3-chip laser-phosphor illumination system such as shown in FIGS. 5 and 6 is shown in FIG. 7.

The difference between the green phosphor spectrum and the yellow phosphor spectrum need not be very large (e.g. a 19 nm shift in peak wavelength and centroid wavelength but this difference can be bigger or smaller depending on the exact phosphors to be compared). However this difference influences significantly the projector performance as will be described in detail below.

Embodiments of the present invention can provide reduced brightness losses when using a specific green phosphor in combination with direct blue lasers and direct red lasers.

The Improvements are Appearing at Different Levels in the Projection Design: e.g. Less Dichroic Losses in the Philips Prism or Similar Dichroic System Used to Separate the White Light into the Three Primaries.

Figure 3:
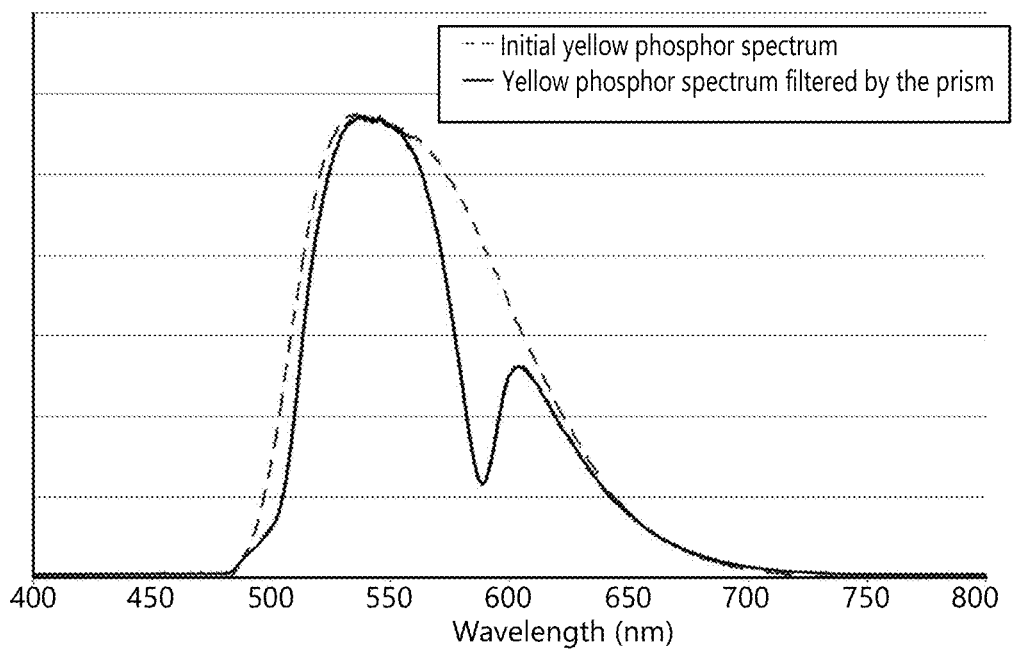
FIG. 3 shows the effect of a Philips prism.
Figure 4:
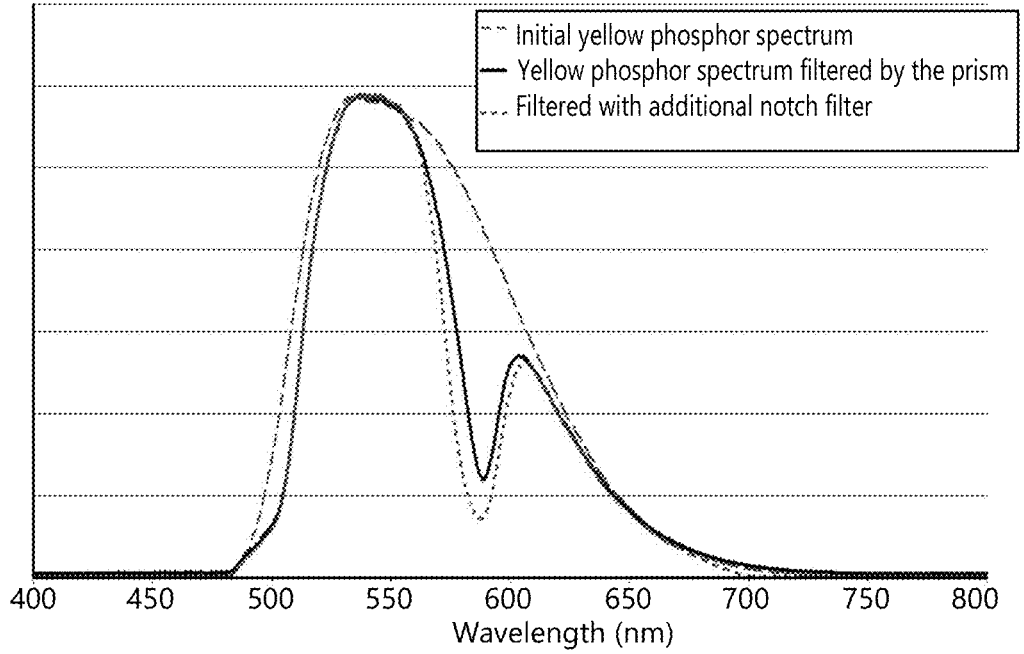
FIG. 4 shows schematically the effect of an additional filtering in the green-red transition interval done with a notch filter.

A typical difference of Angle Of Incidence (AOI) on the Philips prism coatings, for incoming and outgoing light, used specifically in 3-chip DLP projector engines, generates "a dip" around 490-500 nm (less visible on FIG. 3) and a more prominent one around 575-600 nm (see FIG. 3). The exact position and shape of the dip depends of course on the coating design and this might influence the end value of the brightness improvement using embodiments of the present invention but the general conclusion remains the same.

Figure 8:
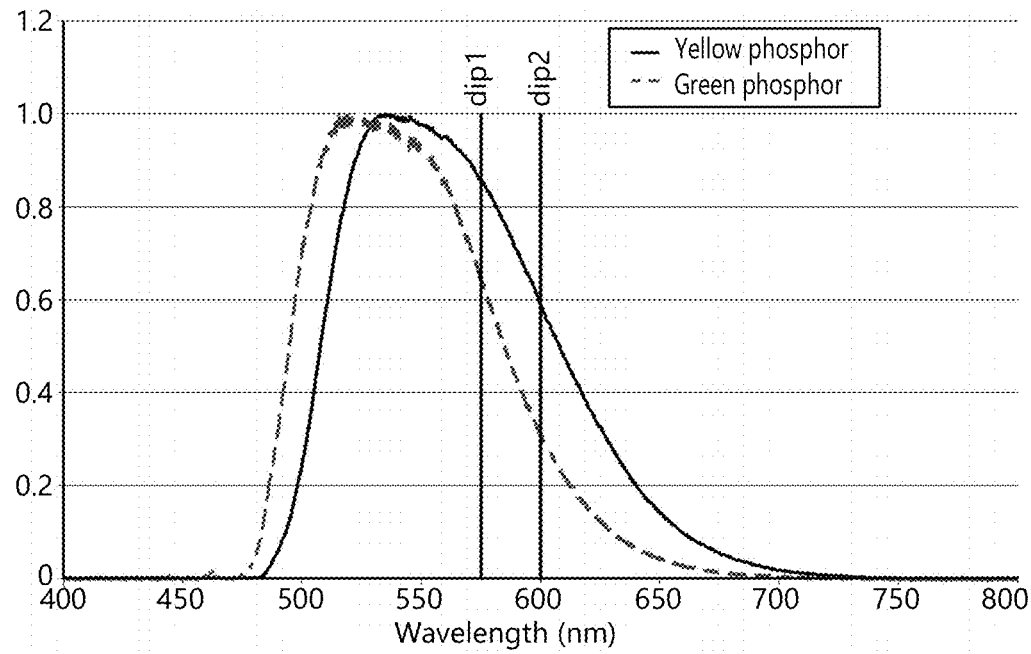
FIG. 8 shows the spectral characteristics of a typical yellow phosphor and a typical green phosphor in the 575-600 nm interval in accordance with an embodiment of the present invention.

The spectral characteristics of a typical yellow phosphor and a typical green phosphor in the 575-600 nm interval are shown in FIG. 8, the interval being indicated by two vertical lines. These lines are also the boundary conditions in the integral above for the GRTZC. The green phosphor will perform better because it has lower energy relatively to the yellow spectrum in that specific wavelength interval. Therefore, the losses will be lower, mainly because the Philips prism possesses a dip in the region shown by the two vertical lines which is shown in FIG. 8 and the green phosphor is shifted towards lower wavelengths from that specific wavelength band.

Figure 9:
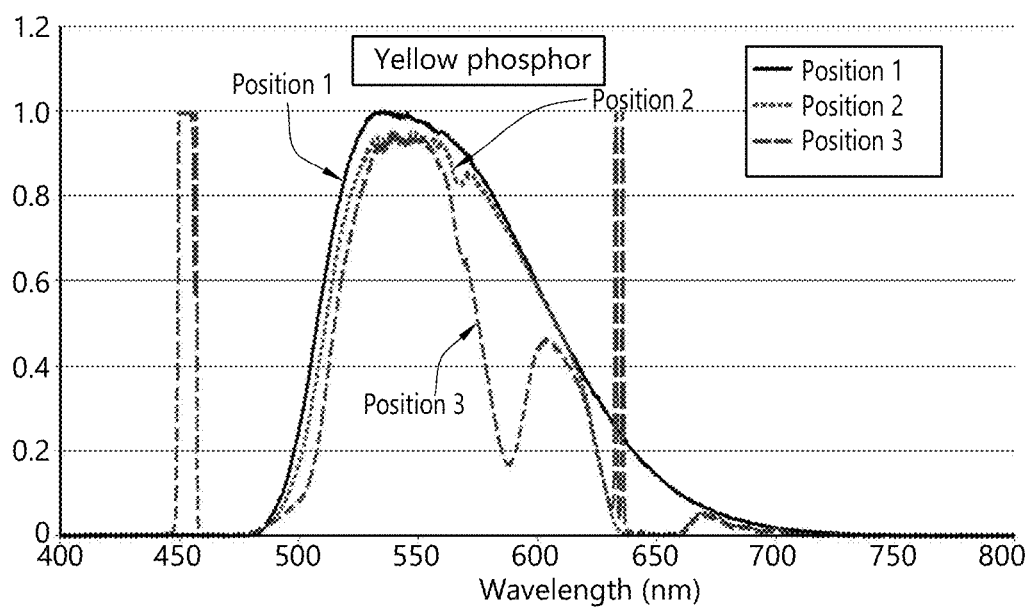
FIG. 9 shows the spectrum for a system 1) (blue lasers+ yellow phosphor+red lasers).

This observation becomes even clearer if the optical spectrum at three different positions is evaluated for:

System 1): blue lasers+yellow phosphor+red lasers (see FIG. 9)

Figure 10:
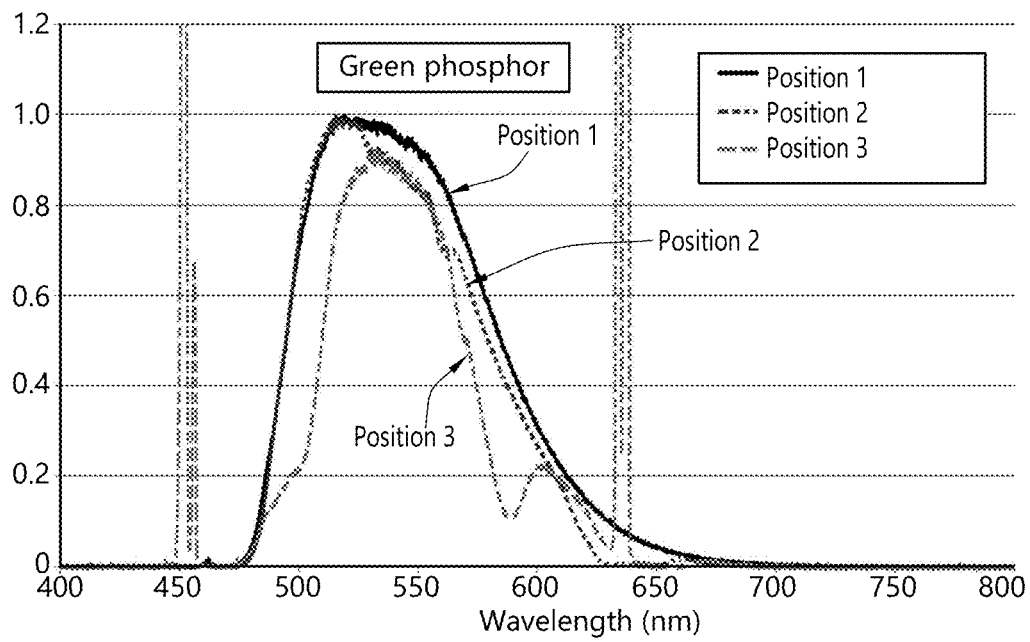
FIG. 10 shows the spectrum for a system 2) (blue lasers+ green phosphor+red lasers) in accordance with an embodiment of the present invention.

System 2): blue lasers+green phosphor+red lasers (embodiments of the present invention, see FIG. 10):

Position 1—this is the phosphor spectrum without any filtering as captured just after the wavelength conversion took place;

Position 2—this is the spectrum after the color beam combination dichroic in the illumination part whereby this performance and energy losses could vary somewhat depending on the beam combination method used in the design—dichroic based or étendue based as explained below.

Position 3—measured after the projection lens and this shows the effect of the Phillips prism By performing power and brightness measurements at different positions, a typical value can be obtained, expressing that on average a system using a yellow phosphor is approximately 9% less bright than a system using a green phosphor in accordance with embodiments of the present invention, due to dichroic losses in the prism alone.

Less Losses Due to the Notch Filter

By measuring the color points of the primaries for both systems 1) and 2) additional problems and sources of losses for the yellow phosphor systems are revealed.

System 2) using the green phosphor plus direct blue and red lasers can be made very close to absolute DCI compliance. First of all, with regard to the color gamut made from the color primaries by applying the illumination to the Philips prism with appropriate coatings, and without using any additional notch filter. Secondly, with regard to the white point, by using the appropriate power levels of the 3 types of laser sources as shown in FIGS. 5 and 6, without any usage—or minimum usage only—of color correction via the imagers.

Figure 11:
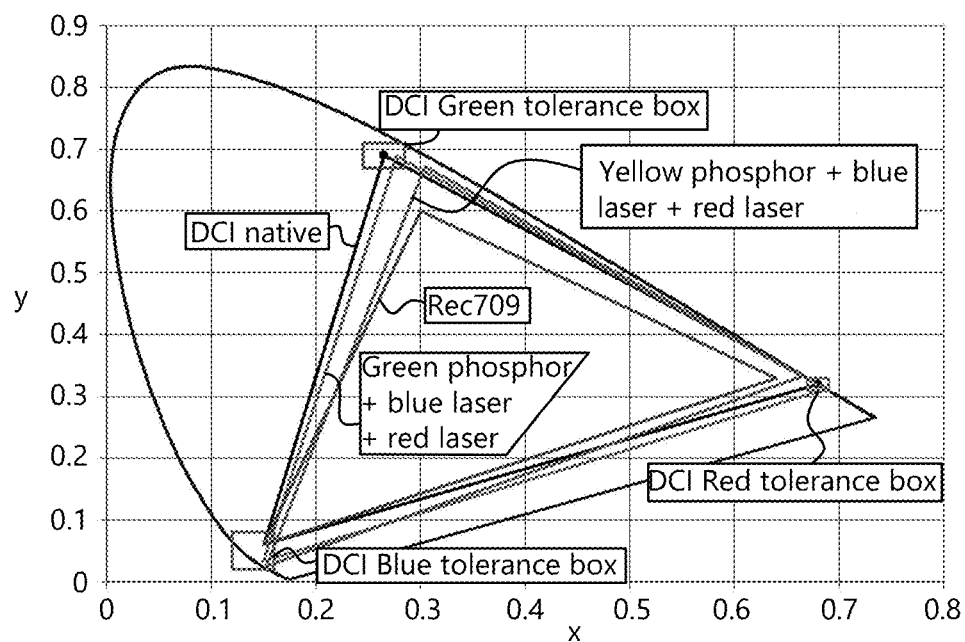
FIG. 11 shows DCI color gamut and REC709 colour gamut in the color space, and respective primary colors tolerance boxes wherein the gamut of the green phosphor with blue and red laser is in accordance with an embodiment of the present invention.
Figure 12:
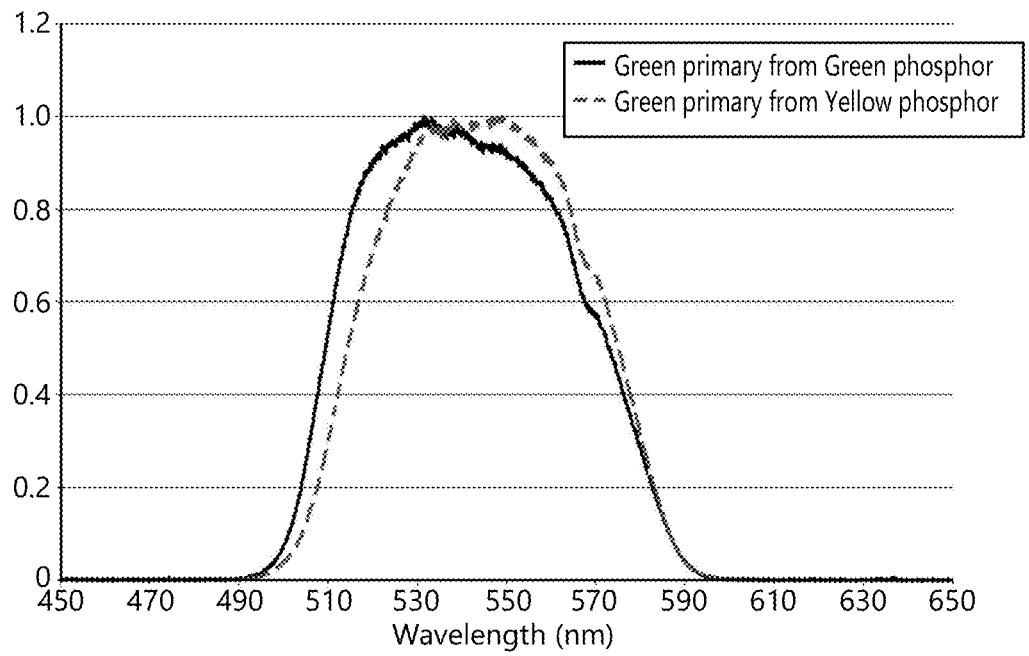
FIG. 12 shows the green primary color waveband generated by green and yellow phosphors whereby the green phosphor spectrum is in accordance with an embodiment of the present invention.

Comparative system 1) using the yellow phosphor is not DCI compliant, especially with regard to the green primary color. A notch filter will be necessary in order to bring the color points of some of the primaries like mainly the green primary in the corresponding DCI tolerance boxes. DCI tolerance boxes denote variations to, for instance, the primary colors so that they are still "within specification". With the prior art yellow phosphor solution and no notch filter applied, the green primary typically falls outside the green tolerance box. This is shown in FIGS. 11 and 12.

And as mentioned before such an extra notch filter, as necessary in a configuration based on a yellow spectrum, is typically responsible for an additional 18% decrease in brightness.

Less Losses in a Dichroic System to Combine the Direct Red Lasers with the Red Light from the Phosphor In a red assisted laser phosphor light source additional red lasers or red LEDs are used in order to improve the red to white ratio, and to widen the red color primary in the achievable color gamut.

Different methods of combining the red light from the red lasers with the red component from the yellow phosphor can be used: étendue, and wavelength based systems are most common. Also polarization-based combination is possible but this requires special measures to the optical design and this is less common. The same methods can be used with embodiments of the present invention which use the green phosphor.

When the wavelength-based recombination method is used, a part of the light from the phosphor is used because it has the same wavelength as the direct lasers.

Figure 13:
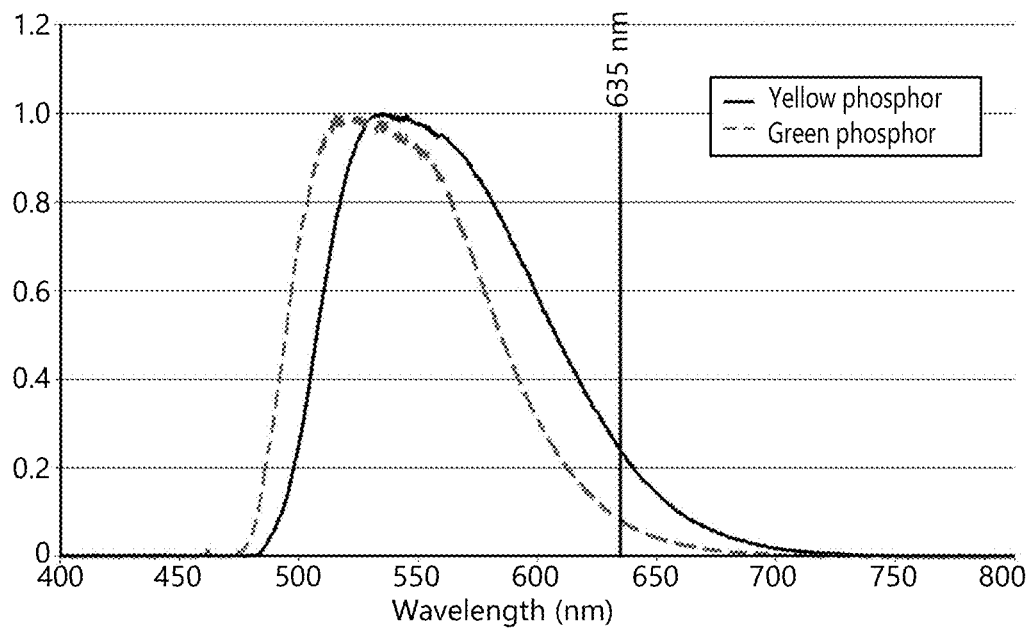
FIG. 13 shows the light spectrum of light emitted by the yellow and green phosphor in accordance with an embodiment of the present invention.
Figure 14:
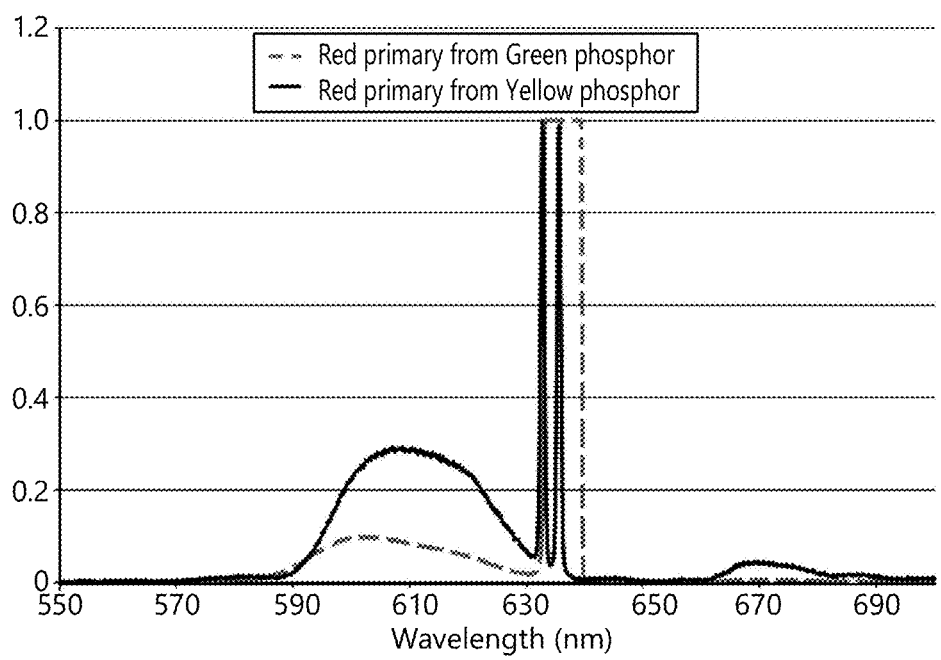
FIG. 14 shows the red primary color waveband generated by yellow and green phosphor in accordance with an embodiment of the present invention.

In FIG. 13 an example is the case of a single 635 nm wavelength.

Less light has to be filtered in the case of the green phosphor (embodiments of the present invention) in order to make room for the addition of direct red lasers. For the case of the two different ("yellow" and "green") phosphors used in these calculations the gain in brightness is approximately 9% again in favor of the green phosphor used in embodiments of the present invention.

In the case of the wavelength recombination for red lasers-red light from the phosphor it is preferred to add additional restriction on the spectra characteristic of the green phosphor in a sense that the Red content is preferably lower than 30%.

Improvements Due to Higher Efficiency of the Green Phosphor

Theoretically a green phosphor will have a higher conversion efficiency due to lower Stokes shift when compared to a yellow phosphor. This means that the same excitation level by blue lasers on green or yellow phosphors will create a higher power level of converted light in case of the green phosphor, which is then moreover more utilized in the green channel (higher Green content), and less wasted in the Green-red transition filtering that happens in the imaging engine (Point 1 and 2 above), and less loss in the red channel when the additional red laser light is added via a dichroic (wavelength based) method (point 3 above).

Counting together the three types of improvement presented above, the embodiments of this invention using a green phosphor excited by blue lasers, with additional blue lasers and red lasers will be approximately 32% more efficient in the use of the phosphor light than the same system using a yellow phosphor as shown in table 4:

TABLE 4

| | |
|---|---|
| Total | 32% |
| Losses due to the dichroic used to make room for the red laser addition | 9% |
| Losses due to the notch filter: | 18% |
| Losses in the prism: | 9% |

Embodiments with Additional Improvements

In the first embodiments of the present invention the characteristics of the green phosphor allows to reduce or minimize the losses in a red assisted configuration. For the second step of the invention embodiments with additional constraints are described that may bring additional improvements:

1. Minimum Blue Content >1.5%

If 445 or 455 nm lasers are used for the direct blue laser path instead of the more expensive 465 nm lasers it is advantageous to have a small part of the phosphor light leaking into the blue channel. The blue primary obtained with direct 445-455 nm lasers is not DCI compliant. However, adding cyan light for the phosphor in the correct amount will bring the blue color point in the DCI tolerance box. This is accomplished in the system using the described green phosphor.

Typically, with yellow phosphors there is less cyan light available as the spectrum is shifted to higher wavelengths as seen on FIG. 13.

2. Minimum Red Content >20%

In the first embodiments of the present invention described above, when wavelength recombination is used for adding the direct red lasers to the red light from the green it is advantageous to have a small red content (e.g. smaller than 30%). However, for de-speckling reasons it is preferred to have as much red contribution from the phosphor as possible, as this is providing a totally speckle free contribution. Therefore, in embodiments of the present invention the red content minimum target is set to 20%. Hence, a preferred range is 20 to 30%.

Embodiments of the present invention provide a 3-chip projector architecture using phosphor light from a green phosphor (e.g. with specific spectral properties) and combine it with additional blue and red laser light in such a way that the projector has a higher light output efficiency in the case of wider color gamut applications like DCI.

For adding the red laser light and the fraction of phosphor light that goes to the imager in the red channel of the imaging module, there are 2 conceptually different methods.

Dichroic based combination

Beam-étendue based combination.

The dichroic-based combination method when used in the embodiments shown in FIG. 5 or 6 uses typically a dichroic mirror to combine the laser light and the phosphor light. This means for instance, like seen on mirror 11 in FIG. 5 or 6, that the red laser light which is typically having a higher wavelength is transmitted towards the imaging engine, and the lower wavelengths of the phosphor light are reflected towards the imaging engine.

Figure 15:
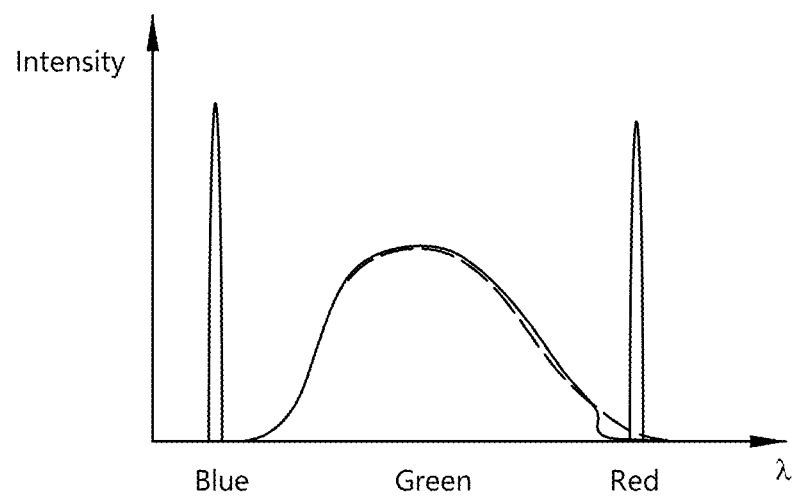
FIG. 15 shows the spectrum of the white beam in the projector upstream before entering the imager.

This combination method includes some losses in the transitional wavelengths, and due to the higher contribution of the small-band laser wavelength, it is preferred to place the transitioning wavelength range (between reflection and transmission of the light) at a bit lower than the laser wavelength, with a result that the higher wavelength contributions of the phosphor light are lost. See FIG. 15.

Figure 16:
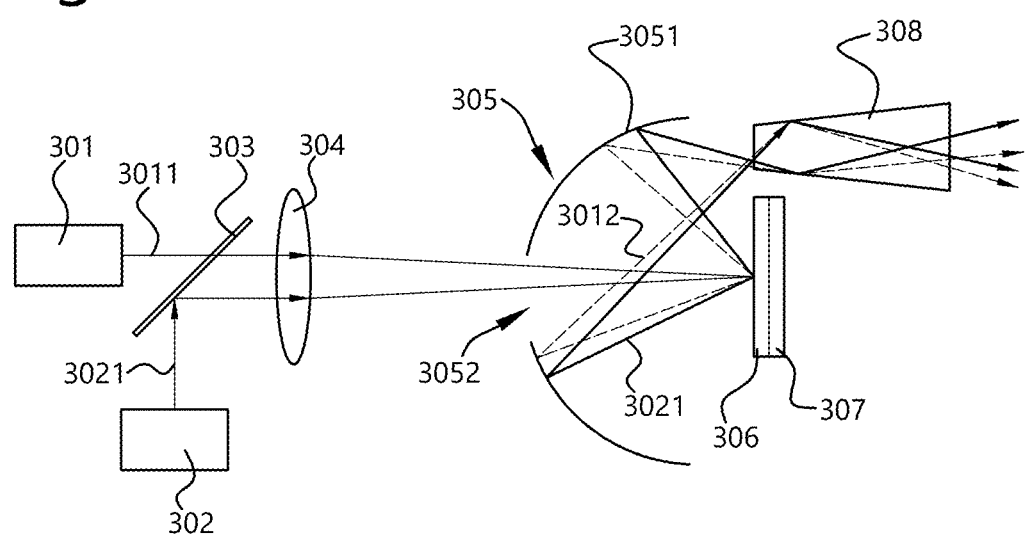
FIG. 16 shows a known system with beam-étendue based method for use with embodiments of the present invention.

The beam-étendue based method is known from US2013/0100644, see FIG. 16. US2013/0100644 is included by reference in its entirety.

US2013/0100644 discloses an excitation light source, a supplemental light source, a light combination device, a light collection device, a light reflection device, a wavelength conversion device, a reflection substrate and a light homogenization device. The excitation light and the supplemental light are combined by the light combination device, then the combined light is incident to the light collection device. After being collected and relayed by the light collection device, the combined light is incident onto the wavelength conversion device. The wavelength conversion device absorbs the incident excitation light and converts it to a converted light whose wavelength is different from that of the excitation light. The converted light generated by the wavelength conversion device is isotropic, so a part of the converted light will propagate in the opposite direction to the excitation light while other part of the converted light will propagate in the forward direction. Meanwhile, a part of the excitation light which is transmitted through the wavelength conversion device will be reflected by the reflection substrate located on the side of the wavelength conversion device facing away from the excitation light source. The incident supplemental light is further scattered by the wavelength conversion device. A part of the scattered supplemental light is reflected directly by the wavelength conversion device and propagates towards the light reflection device, while other part of the scattered supplemental light passes through the wavelength conversion device and is reflected by the reflection substrate back to the wavelength conversion device and passes through it. Most of the converted light and most of the supplemental light are collected and directed to the light homogenization device for homogenization.

In this case, the light collection optics is made that captures the reflected light converted by the phosphor from a first laser source exciting the phosphor, and the reflected from the additional laser source of another color. There are no losses from a wavelength point of view. The spectrum of the red laser will be superimposed to the spectrum of the phosphor light, without a transition zone and spectral dip for wavelengths slightly smaller than the red laser wavelength.

However, in this case there will be still some geometrically based losses from the reflected laser light that can travel back into the entrance aperture in this system, even if the additional idea of a reflecting filter for the phosphor light is added as described in US2013/0194551. The beam-étendue based combination system suffers from the geometrical losses formed by the entrance opening in the collection optics, and is, hence, in general less efficient for this function.

The idea of using the green phosphor with its specific spectral characteristics will not be affected by this combination method, with regard to the following aspects:

The amount of yellow light that is lost in the Philips prism and/or additional notch filter.

The lower dominant wavelength of the light that arrives in the green channel of the 3-chip imager.

The amount of cyan light from the green phosphor.

Use of a green phosphor instead of a yellow phosphor is advantageous for the case when using the dichroic-based combination method, and where the amount of far red phosphor converted light lost will be lower in the case of the green phosphor instead of the yellow phosphor.

However, as will be described further in a second embodiment, the embodiments according to the present invention are not limited to a green phosphor.

Second Embodiment

In accordance with a second embodiment according to the present invention, the wavelength conversion element 8 shown in FIG. 5 or in FIG. 6 can be a yellow phosphor, in which case the light emitted by the conversion element has a spectrum similar to state of the art projectors, as the one illustrated in FIG. 3.

The yellow phosphor is responsible for the generation of the primary red and green, however, with an excess of green and intermediate wavelengths located between the primary green and red, leading to a desaturation of primary colors as described previously. However, an important distinction with respect to prior art projectors pertains to the use of two independent lasers for the generation of the blue primary color and for exciting the wavelength conversion element, thereby increasing the number of degrees of freedom for controlling the white point of the projector.

As the red primary color is provided by the wavelength conversion element, the red laser becomes optional. It can be used to increase the red contribution or it can be removed in which case the red primary color will only be provided by means of the wavelength conversion element.

Assuming the red laser is not used, in this second embodiment according to the present invention, the excess of the green waveband cannot be reduced independently of the red waveband. It is thereby desirable to provide further means to reduce the contribution of the green waveband independently of the red. Such means can be provided by a variable green waveband reduction filter.

Reducing the contribution of any waveband responsible for the generation of a primary color whose contribution is in excess before entering the corresponding light modulator presents the advantage of reducing the heating, and thereby losses, generated by said light modulator but also of improving the contrast ratio and the bit depth for the primary color corresponding to the light modulator.

However, such means are not incompatible with the use of the red laser, as the variable waveband reduction filter provides additional degrees of freedom for regulating the white point.

Blue laser 3 and blue laser 5 can emit light in a waveband of [380, 495] nm. Note that towards the shorter wavelengths of the range, the human eye sees the blue as violet. As the blue laser 5 produces light that is used for the blue primary color (or the blue waveband of the imaging module), this light source determines the visual perception of "blue images", in practice only a small waveband interval is suited, around 465 nm, for instance laser wavelengths of 450 to 470 nm. Below 450 nm, the blue becomes very violet.

The blue laser 5 is dedicated for the excitation of the wavelength conversion element. Theoretically, this excitation may be induced by any wavelength that excites the phosphor (as given by the phosphor absorption spectrum), so i.e. the mentioned 380 to 495 nm interval. However, the skilled person will appreciate that lasers for exciting the phosphor are not limited the waveband corresponding to blue light, and lasers with wavelengths lower than 380 nm, i.e. UV lasers, are also suitable for exciting the phosphor.

In preferred embodiments, each light source has a full width at half maximum (FWHM) of approximately 5 nm.

For example, the laser 5 can emit a light beam 5' having a central wavelength of 465 nm, with a waveband of +/−5 nm, and the laser 5can emit a light beam having a central wavelength of 445 nm, with a waveband of +/−5 nm.

Each laser source can comprise an array of lasers. In an embodiment of the present invention, the laser 5 comprises an array of 16 lasers and the laser 3 comprises an array of 48 lasers. Each laser can be a laser diode. Laser arrays commonly use a single laser diode type and provide multiple laser beams.

The wavelength conversion element 8, after absorption of a light beam at an excitation wavelength, emits a light beam, by transmission or reflection, whose wavelengths band is altered with respect to the wavelength of the absorbed light beam.

Wavelength conversion element 8 can be a phosphor, which after absorption of the blue beam 2', emits a converted beam which, due to the phosphor emission, comprises green, yellow and red light. The phosphor has converted the blue emission of the second light beam centered on the 445 nm wavelength to light emitted in the waveband of 500 nm to 700 nm with a peak at around 570 nm, so that it serves simultaneously for generating green light and red light. However, the spectrum also shows a lack of red light and an excess of green light and of yellow light.

The excess of yellow light can be removed by means of a notch filter, as for prior art projectors. The yellow notch filter can attenuate the light in the narrow waveband 570-600 nm, preferably with a transmission as low as possible, for example around 10-15%. To the user, the use of this filter results in a green which appears less yellowish and a red which appears less orange, and therefore, a native white point with less yellow.

However, light beam exiting said yellow notch filter 370 still exhibits an excess green light.

To compensate for the ageing of lasers, and/or for the ageing of the wavelength conversion element 8, and advantageously to further reduce the amount of blue and/or green light inherent to the laser phosphor system described in the present embodiment, it is an advantage of the present invention to provide means to adjust the relative contribution of each waveband in order to generate native primary colors matching as much as possible target primary colors. As a result, each native primary color fed to the imaging module matches the required set of color coordinates for example as defined in the DCI system and thereby matches the target white point without losing contrast nor bit depth, even when the lasers or other optical components are aging.

Embodiments of the present invention provide solutions to the problems mentioned above. In accordance with embodiments of the present invention the green waveband reduction filter comprises a variable green waveband reduction filter so as to adjust the amount of green light transmitted through said filter. Advantageously, the reduction of the green light contributing to the primary green color upstream from the imaging module hinders the reduction of green light by the corresponding DMD, thereby keeping the movement range of the DMDs to its maximum, and thereby maintaining the bit depth associated to said color channel.

FIGS. 19a to 19e illustrate different embodiments of a variable green waveband reduction filter according to embodiments of the present invention.

The embodiment of FIG. 19a comprises a green filter coating comprising a pattern on one side of the filter with an increased density of green-reducing patterns.

In preferred embodiments, the green light reduction filter comprises an actuator such that the amount of green light transmitted by said filter can be adjusted by moving the position of said filter. The actuator can be a rotation stage for rotating the tunable filter or at least one translation stage for moving the tunable filter in a direction perpendicular to the optical axis. The coating pattern advantageously comprises a pattern with an increased density of green-reducing patterns, the direction of density increase being adapted to the direction of movement of the mechanical actuator such that the intensity of the green spectral band can be adjusted. In preferred embodiments, the actuator can be driven by a controller.

Preferred embodiments of the present invention combine the variable green reduction filter with the yellow notch filter. An example of such a filter comprises the green pattern coating on one side, and the coating of the yellow notch filter on the other side. As a consequence, the projection system may only restrict the yellow light from entering the imaging module or further adjust the amount of green light, as a function of the performance of the system (ageing of the lasers, phosphor, wavelength conversion element 8) and the desired optical output.

Other embodiments of variable green waveband reduction filters are illustrated in FIGS. 19b to 19e. FIG. 19b shows a filter with a rectangular continuous green reduction coating which provides linear, adjustable attenuation within the coated region via translation, FIG. 19c shows a filter with a rectangular reduction in step coating which provides adjustable attenuation in steps within the coated region via translation, FIG. 19d shows a round filter which provides linear, adjustable attenuation within the coated region via rotation and FIG. 19e shows a round filter which provides linear attenuation in steps within the coated region via rotation of the filter. The filters shown in FIG. 19 can advantageously be combined with the yellow notch filter to reduce the amount of optical elements in the projection system.

Figure 20:
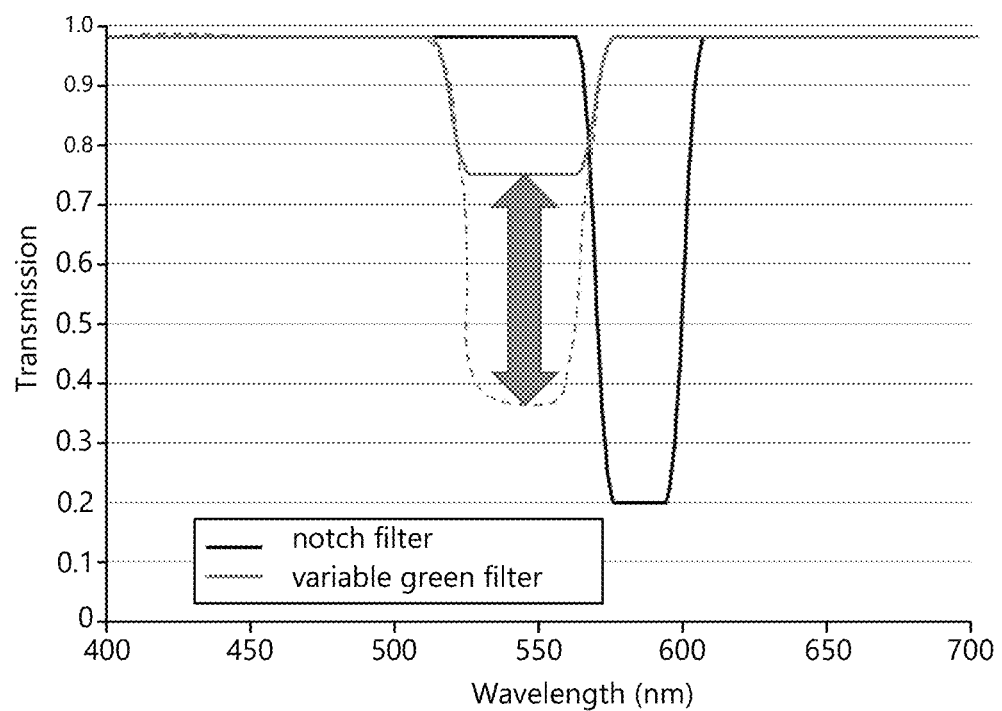
FIG. 20 shows the transmission of a green variable reduction filter combined with a notch in accordance with embodiments of the present invention

FIG. 20 shows the effect of a movement of a variable green waveband reduction filter according to embodiments of the present invention on the transmission provided by the filter.

Other embodiments can comprise a filter wheel with a plurality of green waveband reduction filters, each with a different transmission, for example 8 filters with transmissions of respectively 20, 30, 40, 50, 60, 70, 80, 90% for the green waveband. The green waveband reduction filter can be associated with the yellow notch filter, as discussed here above. The variable green waveband reduction filter can reduce wavebands in the range 510-570 nm, and wherein the reduction factor is as constant as possible over this spectral range.

A consequence of the new filtering characteristic according to the present invention, which comprises a combination of the yellow notch filter and the green waveband intensity reduction filter is a reduction of the green excess light in the illumination going towards the imaging module 380, thereby improving the final contrast, bit depth, and white point achievable.

A variable waveband reduction filter as shown in FIG. 19 can be adapted to any waveband which requires dimming upstream of the DMDs. In particular, a variable red or blue waveband reduction filter can be implemented in the optical path of the white beam or to further reduce the reddish and blueish light from the wavelength conversion element (i.e. In these embodiments, the variable blue and red reduction filter are similar to the variable green reduction filter shown in FIGS. 19 a to e. The variable blue reduction filter can reduce the intensity of wavelengths in the blue wavelength range and the variable red reduction filter can reduce the intensity of wavelengths in the red wavelength range, and wherein the reduction factor is as constant as possible over this spectral range. As for the variable green reduction filter, the actuator is preferably driven by a controller.

Sensing Device

Embodiments of the present invention can make use of an external multiband sensor or an integrated sensor. An external sensor detects a level of illumination of emitted from the projection lens, An external or internal sensor detects a level of illumination of the imaging part of the projector or light emitted from the projection lens respectively, and the sensor values are fed back to a monitoring and/or directly to a processing unit of the controller. A new driving level is chosen for driving the illumination component(s) in accordance with the sensed values so that the light level is controlled, i.e. a higher driving level so that the light output loss is compensated, e.g. as described in US 2011/304659 for lamp based projectors.

Figure 17:
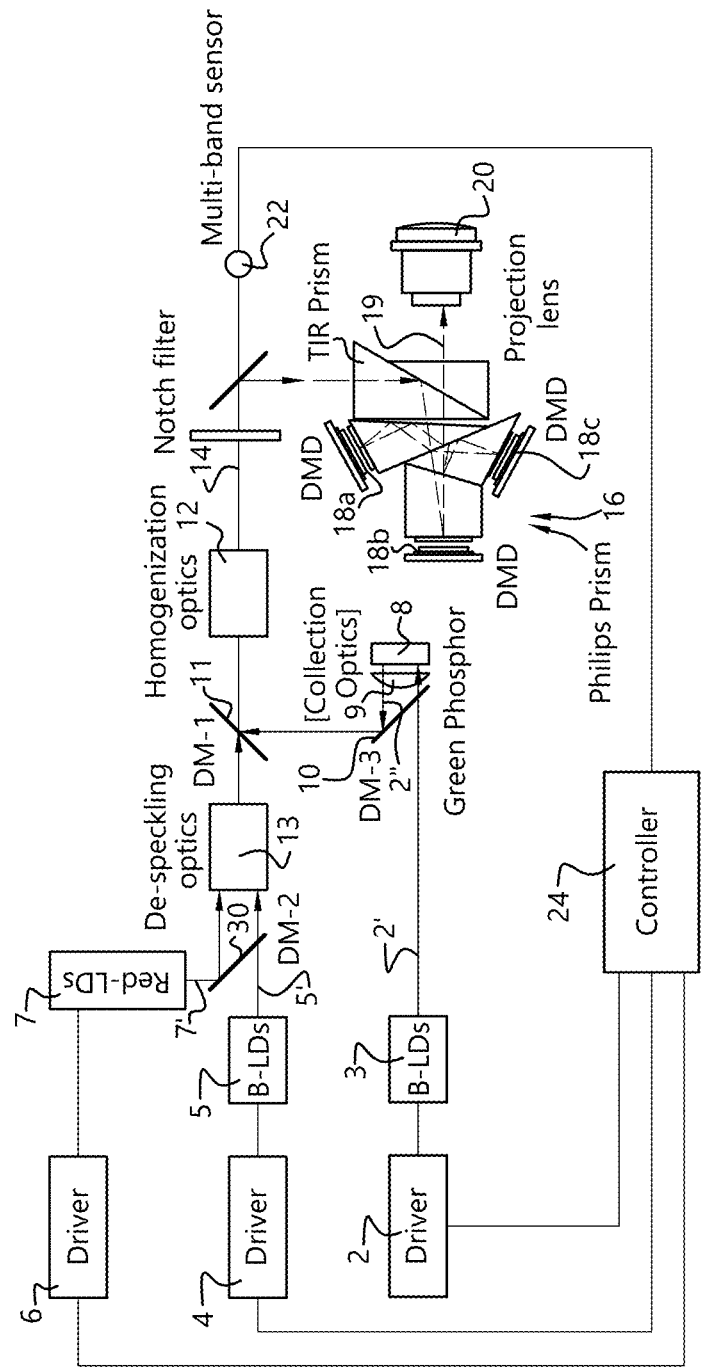
FIG. 17 shows the addition of a sensor and controller which provided feedback control of the drivers to the embodiment shown in FIG. 5.

In the case of an illumination system in accordance with embodiments of the present invention, a color sensor can be added that makes it possible to control of the light level, with maintenance of the white point and the color points. For this, the color sensor is preferably equipped with multi-band sensing possibilities. An embodiment of the present invention and an example of the location of a multiband sensor, and an example of the sensitivity ranges of the multi-band sensor are described with reference to FIGS. 17 and 18. FIG. 17 shows the addition of a sensor 22 and controller 24 which provided feedback control of the drivers 2, 4, 6, and where applicable to the driver of the actuator of a variable waveband reduction filter (not shown) to the embodiment shown in FIG. 5. The same sensor 22 and controller 24 can be added in exactly the same way to the embodiment shown in FIG. 6 and is included as an embodiment of the present invention.

The light sensor or sensors can be at least one of a photodiode sensor, photoresistor, organic photoreceptor, spectrometers, photo-amplifiers, CCD- or CMOS sensors.

The controller 24 takes the feedback from the multiple band sensing of the color sensor 22, and from that derives the correct driving levels for the drivers 2, 4, 6 of the different laser sources 3, 5, 7 respectively, and the driver of the variable waveband reduction filter, when applicable, so that the desired brightness level is reached for the projector at a certain desired (and stabile) white point. And on a second level this approach can also be used to correct for any difference of the individual primary color points from the projector, for instance—to give an example—to compensate for a changing ratio of red laser light and red light from the phosphor, which would affect the color point of the red primary composed out of the 2 contributions.

The present invention provides an independent invention of a multi-band color sensor for monitoring combinations of phosphor light and laser light. This independent invention provides a controller that takes the feedback from multiple band sensing of a color sensor or color sensors, and from that derives the correct driving levels for at least one driver of one or more laser sources, and when applicable the correct driving level of a variable waveband reduction filter so that a desired brightness level is reached at a certain desired (and stabile) white point. This embodiment can be used to correct for any difference of individual primary color points, for instance, to compensate for a changing ratio of red laser light and red light from a phosphor, which would affect the color point of the red primary composed out of two red contributions. This embodiment can also comprise a processing unit of the controller configured to communicate with a multi-band optical monitoring unit adapted for measuring the relative intensity of first, second and third wavelength bands of a white beam, said processing unit of the controller further calculating a change in the drive levels of the first to third laser beams and the drive positions of the variable waveband reduction filter when applicable according to the relative intensity of the first, second and third wavebands of the white beam to adjust a white point shift, and the first to third laser drivers are independently controlled so as to adjust the light intensity of each of a first and second blue laser sources independently of the light intensity of a red laser source.

In other embodiments, the multiband sensors can be placed on the screen, and periodically measure a small area any of the projected image (for example on the projection screen of a movie theatre).

In embodiments of the present invention, the multiband sensor can be embedded inside the projector system, a variable blue and red reduction filter can be used to further reduce the reddish and thereby periodically calibrate the primary color control means. Periodically can be at system start up or shut down, during projection, during periodic calibrations of the system, for example before each projection, or on a monthly basis etc. Calibration can also be performed before a projection, with a predefined test pattern. The multiband sensor can preferably receive light from the light beam by a foldable mirror positioned in the optical path. The foldable mirror is configured to receive for example, 0.5% of the light beam. Hence, 99.5% of light remains transmitted to the imaging module. The loss of light is negligible compared to the gain provided. The system can be adapted to move the foldable mirror into and out of the light beam.

Laser Embodiments

In the presently described embodiments of the present invention, light sources 320, 330 are advantageously laser light sources, comprising an array of lasers. An advantage provided by laser light sources is that a laser provides a collimated light beam with a small étendue. However, the invention is not limited to laser light sources, and can also comprise LED light sources or superluminescent diodes.

For laser sources that provide direct illumination for a certain waveband of light in the imaging module, without any wavelength conversion element (i.e. specific wavelength ranges) going into the red and blue channel, for better color tuning.

In these embodiments, the blue and red reduction filter comprises an actuator such that the amount of blue and red light transmitted by said filter can be adjusted by moving the position of said filter. The actuator can be a rotation stage for rotating the tunable filter or at least one translation stage for moving the tunable filter in a direction perpendicular to the optical axis of the projector system. The filter can include a coating pattern. The pattern can have an increased density of blue and red reducing patterns, the direction of density increase being adapted to the direction of movement of the mechanical actuator such that the intensity of blue and red light can be adjusted. in the optical path, it may be beneficial to add despeckling means to reduce speckles in the final image on screen (in that primary color). Such despeckling techniques may comprise polarization diversity, wavelength diversity, spatial and angular diversity, whose advantages provide a reduction of speckles in the projected image.

As the multiband sensor preferably measures at least the relative intensity of the wavebands corresponding to the primary colors of the projection system, a full spectral measurement can be useful when drastic changes in the spectrum occur, as such changes can have a severe impact on the white point even regardless of a change in radiance or general intensity of the beam. In such particular cases, a recalibration of the system with a spectrograph can be beneficial for a white point reset.

The various laser drivers and variable waveband reduction drivers provide new degrees of freedom within the color space, and therefore wider color gamuts within the color space can be provided by the primary color control means described in the present patent application. As there is a tendency now to move to wider color gamut also for other applications (in extremum the Rec 2020 gamut), the invention described can also have an application for such Wide Color Gamut activities more generically than DCI.

There is a need to calibrate three projectors for use at the same time, e.g. in accordance with the Barco Escape™ film platform. In accordance with embodiments of the present invention a processing unit can be connected to the three or more projectors via cable (e.g. USB) or by a wireless connection. The processing unit is preferably connected to a monitoring unit which itself is connected to a multiband sensor for each projector. The monitoring unit and/or the processing unit can be integrated in a projector or can be a stand-alone device. Hence, three or more (N) projectors can be provided with a monitoring unit inside each projector and a multiband sensor placed in front of the projection lens or integrated inside the projector.

The processing unit can initiate a series of test images and record the results from sensors placed in front of the projector lens. For internal sensors test patterns are not required, the sensors being placed in the illumination beam, and it is preferred to work with "relative values" i.e. with differences between the factory set values (only an initial calibration in the factory involving an external color meter is required). and the actual values rather than working with absolute values. The initial measurement results for the sensors are used in the factory alignment with the target color performance on screen, and these initial measurement results can be stored in a projector, a local processing engine such as a laptop or remotely.

A variable waveband-reduction filter can be positioned in the optical path to reduce light in the blue imager waveband and in the red imager waveband respectively, without affecting the respective laser contributions. In this way, the color points of blue and red can be tuned between the laser point and the color point of the mix of laser light and light from the wavelength conversion means e.g. phosphor light.

Although electronic correction system have been developed to set color primaries and white point electronically, with embodiments of the present invention electronic correction is avoided or reduced. This can be done by color tuning with for example with methods and assemblies having a green phosphor. White color balancing can be adjusted manually on the processing unit by controlling laser drivers and adjustable intensity filters where present as well as a variable or moveable waveband reduction filter. This is a significant improvement over prior art devices.

Color gamut data, color coordinates and relative luminance values can be obtained by this monitoring method and can be stored in the projectors themselves in the processing unit or elsewhere e.g. on a server in a local area or wide area network such as the Internet. Such values can be measured in the factory using test patterns and good color meters, and stored in the projectors.

For an alignment in an installation in the field, the common desired color gamut and white point can be set by looking at the data. An application can be run on a computer, PDA, smartphone etc. which reads out the stored gamut values, optionally via a network link and the best inscribed gamut and white point are found. Or a data link may be between the projectors and a server via the network where the calculations are done in the server. This can be advantageous because such a server can have powerful microprocessors. The stored values can be updated to take into account ageing effects using the multiband sensors and test patterns can be used again.

A processing unit with a processing engine such as one or more microprocessors inside the projector, local to the projector or remotely located can carry out the above alignment procedure automatically. This can be achieved by communication between a number of projectors, exchanging of sensor values and setting status, e.g. which can become necessary if one of the settings becomes no longer achievable. If necessary a downgrading of the targets could be performed for instance.

A similar calibration procedure can be made when a plurality of projectors are used to with overlapping of the projected images at join positions. In the overlapped zone electronic blending can be used. However, if the projectors emit different colours the blended regions can become visible. This can be disturbing for planetariums, simulators or other Virtual Reality applications. For simulation, e.g. used for training there are several types of multichannel systems which can make use of embodiments of the present invention, like multifaceted displays, Collimated displays, Reality Centers, CAVEs', . . . . The latter multiprojector applications do not need to achieve a cinema standard such as DCI hence the color gamut size can be less relevant than color matching.

Barco Escape™ is a multiprojector set-up for cinemas, for instance having a centre screen and two side screens. For best performance and acceptance the projectors should comply with the Digital Cinema specifications, for instance to the DCI color gamut. The embodiments using a green wavelength conversion element such as a green phosphor are efficient for DCI or other similar wide color gamuts.

The images are on different three screens at different angles, so it is assumed that the main disturbance of the matching between the images would be the different color point, more than if there would be some variations in brightness. The embodiments of the present invention can be applied to Escape™ in that the three projector system can be color matched with DCI color gamut compliance.

For a projector with a green wavelength conversion element according to embodiments of the present invention and no addition of a variable waveband reduction filter, three different adjustment settings $s_i$ per projector of N projectors: the direct blue laser power level, the blue laser power level for the excitation of the wavelength conversion element such as a phosphor, and the power level of the red lasers. For the multiple projectors all the settings $s_{i,j}$ of setting type i and projector j are set so that all of the projected white points are set to the common white point which is the DCI target point. For instance, assuming the projectors have aged differently, the intensity ratios of the intensity when aged to initial value $I_{aged}/I_{init}$ should be made equal for all sub-wavebands of all projectors, taking an overall maximum target value for this ratio so that none of the settings $s_{i,j}$ of any of the projectors surpasses the maximum value for that setting (i.e. is kept only equal or lower).

Another way of operation of a DCI compliant system is to only aim for a certain light output which is lower than maximum possible by the projector, for instance to strictly comply to the DCI luminance spec on the screen. In that case the settings $s_i$ will need to be adjusted until also that initial illumination level is obtained. Also, the white point can be partially adjusted via the illumination level and the settings $s_i$, and partially via electronic correction. A low or lower amount of electronic correction but can be tolerated for some applications.

For embodiments with a waveband reduction filter, the same settings $s_{i,j}$ can be adjusted to fix the projectors to the white point (without electronic correction). As such, as far as the laser contribution versus the contribution from the wavelength conversion element such as from a phosphor both in red and blue have become different, the extra capability to control and set the waveband reduction filters can be used to reduce the phosphor tail contributions as well, so that the color gamut can be greater again, while for white this can be compensated by increasing the laser contribution again.

3D projection can be achieved using embodiments of the present invention. Firstly red lasers and blue lasers of different and not overlapping wavelengths can be used for the left and right eye. In one optical channel, such as the right eye channel green Quantum Dots can be used and for the other eye a yellow Quantum Dots, each exited by laser light. The viewing glasses are provided with a filter that would filter between left and right eye optical signals emitted from the projector.

Alternatively, a projector can include red and blue laser with different wavelengths for the left and right eye. The light from the yellow or green wavelength conversion element such as phosphor can be polarised in different directions. The viewer wears glasses that filter the relevant right or left eye wavelengths and in the case of green colours, the glasses have the correct polarity to receive the modulated green light.

In an independent aspect of the present invention (which can also be combined with any other embodiment) a light projection system is described for generating an image with three primary colors, in particular, blue, green, and red, each primary color being respectively defined by a first, second and third wavebands, said light projection system comprising a first blue laser source emitting a first beam in a fourth waveband, said first blue laser source having a first laser driver, a second blue laser source emitting a second beam having a central wavelength and a fifth waveband, said second blue laser source having a second laser driver, a substrate having a wavelength conversion element for emitting light at a plurality of wavelengths after absorption of a light beam at an excitation wavelength within a fifth waveband of the second blue laser source, said substrate being positioned in an optical path of said second beam such that light transmitted through or reflected from the wavelength conversion element results in emission of a converted beam having a waveband comprising at least the second and third wavebands, a beam combiner for combining the first beam and the converted beam, which combination results in a white beam;

characterized in that the projection system further comprises an optical monitoring unit for measuring the relative intensity of the first, second and third wavebands of the white beam.

In such a light projection system the optical monitoring unit can comprise at least one light sensor.

In such Light projection system the light sensor can be a multiband sensor configured to measure the intensity of wavelengths comprised in the first, second and third wavebands.

The multiband sensor can be configured to detect a or any difference in the light spectrum between a laser light and a converted beam.

The light sensor can be at least one of a photodiode sensor, photoresistor, organic photoreceptor, spectrometer, photo-amplifiers, CCD- or CMOS sensors.

The projection system can further comprise a processing unit configured to communicate with the optical monitoring unit.

In such a light projection system the optical monitoring unit can receive light by means of a foldable mirror placed in the optical path of the white beam, such that approximately 0.5% of the light is reflected to the light sensor. The foldable mirror can be configured to be retracted in and out from the white beam. The foldable mirror can be mounted on an actuator controlled by the processing unit.

The wavelength conversion element can emit converted light at, for example:

a centroid wavelength <560 nm and/or
a GRTZC <16%.

Hence, the wavelength conversion element can, for example, emit light at a green content >65%, the green content can be optionally <75%, optionally <80%.

For example, light emitted from the wavelength conversion element can have:

a green content >65%, wherein the green content is defined as a portion of light spectrum of the light emitted from the wavelength conversion element that goes into the green waveband, wherein the green waveband is in the range 495-575 nm, and a Green-Red transition zone content (GRTZC), defined as $$GRTZC\ (\%) = \frac{\int_{575\ nm}^{600\ nm} S(\lambda)d\lambda}{\int_{400\ nm}^{800\ nm} S(\lambda)d\lambda} * 100,$$

is smaller than 16%.

A third red laser source can be provided emitting a third beam in the third waveband, said third red laser source having a third laser driver.

Such a light projection system can be implemented as a 3-chip projector architecture.

The first or third waveband can be wider than the waveband of any individual laser source.

Bluish light from the wavelength conversion element can be added in the waveband 480-500 nm.

The blue laser can emit light in the waveband 440-470 nm wavelength.

In such a light projection system a red content is preferably <30% and optionally >20%, the percentage values relating to relative energy contributions of the converted light from the wavelength conversion element in a certain wavelength range compared to the whole light spectrum from the wavelength conversion element which is taken as 100%.

In such a system, a green content is a portion of light spectrum of the light emitted from the wavelength conversion element that goes into the green waveband. For example the green waveband can be in the range 495-575 nm.

GRTZC refers for example, to light that desaturates colors and makes the color gamut smaller.

In such a system, a red content in a light beam can be the relative portion of the wavelength conversion element spectrum that goes into the red waveband. The red waveband can have light from a red laser, and an added amount of red light from the wavelength conversion element for de-speckling and optionally to increase the green light in the light from the wavelength conversion element. An upper limit of the reddish light is reached if the color point of red moves to a smaller color gamut. The reddish light can be orange light in the range 595-620 nm.

The Blue light content+Green light content+Red light content is to be understood to amount to 100% for the light from the wavelength conversion element.

A notch filter can be provided for reducing light intensity of wavelengths in the waveband 570-600 nm. However filtering wastes light and is less preferred. The notch filter can be configured to reduce light intensity in the range 10-15% or 10 to 20%.

In such a light projection system at least one variable waveband reduction filter can be provided mounted on an actuator and provided in the optical path of the white beam, and wherein a movement of said variable waveband reduction filter between a first and a second position results in a change of the transmitted waveband of the white beam from a first to a second transmitted intensity, such as to adjust a projector white point.

The variable waveband reduction filter can be a first waveband reduction filter, a second waveband reduction filter or a third waveband reduction filter, such that it is configured to change the intensity of wavelengths comprised in the first, second or third wavebands respectively. The notch filter and the variable waveband reduction filter can be combined in a same variable filter. A first side of the variable filter can be coated with a narrow band notch filter and a second side of the filter can be coated with a variable waveband reduction filter. The variable second waveband reduction filter can be configured to reduce the intensity of wavelengths comprised in the range 510-570 nm.

The actuator can be controlled by the processing unit. For example, the actuator can comprise a rotation stage for rotating the variable second waveband reduction filter around the optical axis or at least one translation stage for moving said variable second waveband reduction filter in a direction perpendicular to the optical axis. The variable second waveband reduction filter can comprise a coating provided with a pattern with an increased density of green-reducing patterns, the direction of density increase being adapted to the direction of movement of the actuator such that the intensity of the second green spectral band can be adjusted. The variable second waveband reduction filter can comprise at least one of a rectangular continuous green reduction coating providing linear, adjustable attenuation within the coated region via translation, a filter with a rectangular reduction in step coating providing adjustable attenuation in steps within the coated region via translation, a round filter providing linear, adjustable attenuation within the coated region via rotation or a round filter providing linear attenuation in steps within the coated region via rotation of the filter.

In such a light projection system the wavelength conversion element can be a phosphorescent material ("phosphor"). The phosphor can be of the type YAG:Ce for example. Or the phosphor can be of the type LUAG:Ce. The wavelength conversion element can comprise quantum dots.

In the system the processing unit can be configured to communicate with the optical monitoring unit for measuring the relative intensity of first, second and third wavelength bands of a white beam, said processing unit further configured to calculate a change in the drive levels of at least one of the first to third laser beams and the drive levels of the at least one variable waveband reduction filter according to the relative intensity of the first, second and third wavebands of the white beam to adjust a white point shift, and the first to third laser drivers being independently controlled so as to adjust the light intensity of each of a first and second blue laser sources independently of the light intensity of a red laser source. The optical monitoring unit can be adapted to monitor different contributions in any, some or all wavebands. The optical monitoring unit can be adapted to monitor both the laser light and the wavelength conversion element light contribution in the blue waveband.

In such a light projection system a variable blue and red reduction filter can be provided. The variable blue and red reduction filter can further reduce the reddish (red) and blueish (blue) light from the wavelength conversion element going into the red and blue channel. The blue and red reduction filter can comprise an actuator such that the amount of blue and red light transmitted by said filter can be adjusted by moving the position of said filter.

In such a light projection system, each laser source can comprise an array of individual lasers, the intensity of each individual laser being controlled by its laser driver and wherein each laser is configured to be pulsed by its associated laser driver. Further beam homogenization optics can be provided and/or despeckling means.

An independent aspect of the present invention (which can be combined with any embodiment) is an optical assembly for a light projection system for generating an image with three primary colors, in particular, blue, green, and red, each primary color being respectively defined by a first, second and third wavebands, the optical assembly for use with a first blue laser source emitting a first beam in a fourth waveband, said first blue laser source having a first laser driver, a second blue laser source emitting a second beam having a central wavelength and a fifth waveband, said second blue laser source having a second laser driver, said assembly comprising a substrate having a wavelength conversion element for emitting light at a plurality of wavelengths after absorption of a light beam at an excitation wavelength within the fifth waveband of the second blue laser source, said substrate being positioned in an optical path of said second beam such that light transmitted through or reflected from the wavelength conversion element results in emission of a converted beam having a waveband comprising at least the second and third wavebands, a beam combiner for combining the first beam and the converted beam, which combination results in a white beam;

characterized in that the optical assembly further comprises an optical monitoring unit for measuring the relative intensity of the first, second and third wavebands of the white beam.

Such an optical assembly can include generating laser light from a third red laser source emitting a third beam of the third waveband, said third red laser source having a third laser driver.

An independent aspect of the present invention (which can be combined with any embodiment) is a method for generating an image with a light projection system with three primary colors, in particular, blue, green, and red, each primary color being respectively defined by a first, second and third waveband, the method comprising generating laser light from a first blue laser source emitting a first beam of a fourth waveband, said first blue laser source having a first laser driver, generating laser light from a second blue laser source emitting a second beam having a central wavelength and a fifth waveband, said second blue laser source having a second laser driver, generating a converted light beam from a substrate having a wavelength conversion element emitting light at a plurality of wavelengths after absorption of a light beam at an excitation wavelength within the fifth waveband of the second blue laser source, said substrate being positioned in an optical path of said second beam such that light transmitted through or reflected from the wavelength conversion element results in emission of a converted beam having a waveband comprising at least the second and third wavebands, combining the combined first and third beam, and the converted beam, which combination results in a white beam;

characterized by measuring the relative intensity of the first, second and third wavebands of the white beam.

Such a method can further comprise generating laser light from a third red laser source emitting a third beam of the third waveband, said third red laser source having a third laser driver.

An independent aspect of the present invention (which can be combined with any embodiment) is a light projection system for generating an image with three primary colors, in particular, blue, green, and red, each primary color being respectively defined by a first, second and third wavebands, said light projection system comprising a first blue laser source emitting a first beam in a fourth waveband, said first blue laser source having a first laser driver, a second blue laser source emitting a second beam having a central wavelength and a fifth waveband, said second blue laser source having a second laser driver, a substrate having a wavelength conversion element for emitting light at a plurality of wavelengths after absorption of a light beam at an excitation wavelength within a fifth waveband of the second blue laser source, said substrate being positioned in an optical path of said second beam such that light transmitted through or reflected from the wavelength conversion element results in emission of a converted beam having a waveband comprising at least the second and third wavebands, a beam combiner for combining the first beam and the converted beam, which combination results in a white beam;

characterized in that the projection system further comprises at least one variable waveband reduction filter mounted on an actuator and provided in the optical path of the white beam, and wherein a movement of said variable waveband reduction filter between a first and a second position results in a change of the transmitted waveband of the white beam from a first to a second transmitted intensity, such as to adjust a projector white point.

The variable waveband reduction filter can be a first waveband reduction filter, a second waveband reduction filter or a third waveband reduction filter, such that it is configured to change the intensity of wavelengths comprised in the first, second or third wavebands respectively.

A notch filter can be provided for reducing light intensity of wavelengths in the waveband 570-600 nm. The notch filter can reduce light intensity in the range 10-15% or 10 to 20%. The notch filter and the variable waveband reduction filter can be combined in a same variable filter. A first side of the variable filter can be coated with a narrow band notch filter and a second side of the filter can be coated with a variable waveband reduction filter.

The variable second waveband reduction filter can be configured to reduce the intensity of wavelengths comprised in the range 510-570 nm.

The actuator is controlled by a processing unit. The actuator can comprise a rotation stage for rotating the variable second waveband reduction filter around the optical axis or at least one translation stage for moving said variable second waveband reduction filter in a direction perpendicular to the optical axis.

The variable second waveband reduction filter can comprise a coating provided with a pattern with an increased density of green-reducing patterns, the direction of density increase being adapted to the direction of movement of the actuator such that the intensity of the second green spectral band can be adjusted.

The variable second waveband reduction filter can comprise at least one of a rectangular continuous green reduction coating providing linear, adjustable attenuation within the coated region via translation, a filter with a rectangular reduction in step coating providing adjustable attenuation in steps within the coated region via translation, a round filter providing linear, adjustable attenuation within the coated region via rotation or a round filter providing linear attenuation in steps within the coated region via rotation of the filter.

A third red laser source can be provided emitting a third beam in the third waveband, said third red laser source having a third laser driver, said third beam being combined to the first beam and converted beam by the beam combiner.

The wavelength conversion element can be selected to emit light with a centroid wavelength <560 nm and/or

GRTZC <16%.

In particular light emitted from the wavelength conversion element can have a green content >65%, wherein the green content is defined as a portion of light spectrum of the light emitted from the wavelength conversion element that goes into the green waveband, wherein the green waveband is in the range 495-575 nm, and a Green-Red transition zone content (GRTZC), defined as $$GRTZC\ (\%) = \frac{\int_{575\ nm}^{600\ nm} S(\lambda)d\lambda}{\int_{400\ nm}^{800\ nm} S(\lambda)d\lambda} * 100,$$

is smaller than 16%.

The green content can be <75%, optionally <80%.

A green content is a portion of light spectrum of the light emitted from the wavelength conversion element that goes into the second waveband. The first or third waveband can be wider than the waveband of any individual laser source. The second waveband can be in the range 495-575 nm. Light in the GRTZC refers to light that desaturates colors and makes the color gamut smaller.

In such a light projection system bluish light can be added from the wavelength conversion element in the waveband 480-500 nm. On the other hand the blue laser can be in the waveband 440-470 nm wavelength.

A red content is preferably <30% and optionally >20%, the percentage values relating to relative energy contributions of the converted light from the wavelength conversion element in a certain wavelength range compared to the whole light spectrum from the wavelength conversion element which is taken as 100%.

A red content in a light beam is the relative portion of the wavelength conversion element spectrum that goes into the third waveband. The third waveband can have light from the red laser, and an added amount of reddish light from the wavelength conversion element for de-speckling. An upper limit of the reddish light can be reached if the color point of red moves to a smaller color gamut. The reddish light can be orange light in the range 595-620 nm.

It is to be understood that the Blue light content+Green light content+Red light content amounts to 100% for the light from the wavelength conversion element.

The wavelength conversion element can be a "phosphor". The phosphor can be of the type YAG:Ce, or of the type LUAG:Ce. Other possibilities are within the scope of the present invention such as the wavelength conversion element comprising quantum dots.

An optical monitoring unit can be provided for measuring the relative intensity of the first, second and third wavebands of the white beam. The optical monitoring unit can comprise at least one light sensor. The light sensor can be a multiband sensor configured to measure the intensity of wavelengths comprised in the first, second and third wavebands. The multiband sensor can be configured to detect a or any difference in the light spectrum between a laser light and a converted beam. The light sensor can be at least one of a photodiode sensor, photoresistor, organic photoreceptor, spectrometer, photo-amplifiers, CCD- or CMOS sensors.

The optical monitoring unit can receive light by means of a foldable mirror placed in the optical path of the white beam, such that approximately 0.5% of the light is reflected to the light sensor. The foldable mirror can be configured to be retracted in and out from the white Such a light projection system can be implemented as a 3-chip projector architecture. beam.

The projection system can further comprise a processing unit configured to communicate with the optical monitoring unit. The foldable mirror can be mounted on an actuator controlled by the processing unit. The processing unit can be configured to communicate with the optical monitoring unit for measuring the relative intensity of first, second and third wavelength bands of a white beam, said processing unit further configured to calculate a change in the drive levels of at least one of the first to third laser beams and the drive levels of the at least one variable waveband reduction filter according to the relative intensity of the first, second and third wavebands of the white beam to adjust a white point shift, and the first to third laser drivers being independently controlled so as to adjust the light intensity of each of a first and second blue laser sources independently of the light intensity of a red laser source.

The optical monitoring unit can be adapted to monitor different contributions in any, some or all wavebands.

The optical monitoring unit can be adapted to monitor both the laser light and the wavelength conversion element light contribution in the blue waveband.

The light projection system can further comprise a variable blue and red reduction filter. The variable blue and red reduction filter can further reduce the reddish and blueish light from the wavelength conversion element going into the red and blue channel. The blue and red reduction filter can comprise an actuator such that the amount of blue and red light transmitted by said filter can be adjusted by moving the position of said filter.

Each laser source can comprise an array of individual lasers, the intensity of each individual laser being controlled by its laser driver and wherein each laser is configured to be pulsed by its associated laser driver.

Such a light projection system can further comprise beam homogenization optics and/or despeckling means.

An independent aspect of the present invention (which can be combined with any embodiment) is an optical assembly for a light projection system for generating an image with three primary colors, in particular, blue, green, and red, each primary color being respectively defined by a first, second and third wavebands, the system having a first blue laser source emitting a first beam in a fourth waveband, said first blue laser source having a first laser driver, and a second blue laser source emitting a second beam having a central wavelength and a fifth waveband, said second blue laser source having a second laser driver, the optical assembly comprising
   a substrate having a wavelength conversion element for emitting light at a plurality of wavelengths after absorption of a light beam at an excitation wavelength within a fifth waveband of the second blue laser source, said substrate being positioned in an optical path of said second beam such that light transmitted through or reflected from the wavelength conversion element results in emission of a converted beam having a waveband comprising at least the second and third wavebands,
   a beam combiner for combining the first beam and the converted beam, which combination results in a white beam;
   characterized in that the projection system further comprises at least one variable waveband reduction filter mounted on an actuator and provided in the optical path of the white beam, and wherein a movement of said variable waveband reduction filter between a first and a second position results in a change of the transmitted waveband of the white beam from a first to a second transmitted intensity, such as to adjust a projector white point.

An independent aspect of the present invention (which can be combined with any embodiment) is a method for generating an image with a light projection system with three primary colors, in particular, blue, green, and red, each primary color being respectively defined by a first, second and third waveband, the method comprising
   generating laser light from a first blue laser source emitting a first beam of the fourth waveband, said first blue laser source having a first laser driver,
   generating laser light from a second blue laser source emitting a second beam having a central wavelength and a waveband, said second blue laser source having a second laser driver,
   generating converted light from a substrate having a wavelength conversion element for emitting light at a plurality of wavelengths after absorption of a light beam at an excitation wavelength within the waveband of the second blue laser source, said substrate being positioned in an optical path of said second beam such that light transmitted through or reflected from the wavelength conversion element results in emission of a converted beam having a waveband comprising at least the second and third wavebands,
   combining the combined first and the converted beam, which combination results in a white beam;
   wherein the method further comprises the steps of
   moving at least one variable waveband reduction filter mounted on an actuator and provided in the optical path of the white beam, and wherein the movement of said variable waveband reduction filter between a first and a second position results in a change of the transmitted waveband of the white beam from a first to a second transmitted intensity, such as to adjust a projector white point.

The invention claimed is:
1. A light projection system for generating an image with three primary colors, in particular, blue, green, and red, each primary color being respectively defined by a first, second and third wavebands, said light projection system comprising:
   a first blue laser source emitting a first beam in the fourth waveband, said first blue laser source having a first laser driver,
   a second blue laser source emitting a second beam having a central wavelength and a fifth waveband, said second blue laser source having a second laser driver,
   a third laser source emitting a third beam of the third waveband, said third red laser source having a third laser driver,
   a substrate having a wavelength conversion element for emitting light at a plurality of wavelengths after absorption of a light beam at an excitation wavelength within the fifth waveband of the second blue laser source, said substrate being positioned in an optical path of said second beam, such that light transmitted through or reflected from the wavelength conversion element results in emission of a converted beam having a waveband comprising at least the second and third wavebands,
   a beam combiner for combining the first beam and the converted beam, which combination results in a white beam;
   wherein the light emitted by the wavelength conversion element has a green content >65%, wherein the green content is defined as a portion of light spectrum of the light emitted from the wavelength conversion element that goes into the green waveband, wherein the green waveband is in the range 495-575 nm, further comprising at least one variable waveband reduction filter provided in the optical path of the white beam.

2. The light projection system according to claim 1, wherein a Green-Red transition zone content (GRTZC), defined as $$GRTZC\ (\%) = \frac{\int_{575\ nm}^{600\ nm} S(\lambda)d\lambda}{\int_{400\ nm}^{800\ nm} S(\lambda)d\lambda} * 100,$$

is smaller than 16%.

3. The light projection system according to claim 1, further comprising a notch filter for reducing light intensity of wavelengths in a waveband 570-600 nm.

4. The light projection system according to claim 3, wherein the notch filter reduces light intensity to a range 10-15% or 10 to 20% transmission through the notch filter compared to an unfiltered light intensity.

5. The light projection system according to claim 1, wherein the wavelength conversion element has a green content <75%.

6. The light projection system according to claim 1, wherein the green content is <80%.

7. The light projection system according to claim 1, wherein the at least one variable waveband reduction filter is mounted on an actuator and wherein a movement of said variable waveband reduction filter between a first and a second position results in a change of the transmitted waveband of the white beam from a first to a second transmitted intensity, such as to adjust a projector white point.

8. The light projection system according to claim 1, wherein the at least one variable waveband reduction filter is a first waveband reduction filter, a second waveband reduction filter or a third waveband reduction filter, such that it is configured to change the intensity of wavelengths comprised in the first, second or third wavebands respectively.

9. The light projection system according to claim 1, wherein the at least one variable waveband reduction filter is configured to reduce the intensity of wavelengths comprised in the range 510-570 nm.

10. The light projection system according to claim 9, wherein the at least one variable waveband reduction filter is configured down to 35% of the initial light intensity.

11. A method for generating an image with a light projection system with three primary colors, in particular, blue, green, and red, each primary color being respectively defined by a first, second and third waveband, the method comprising:

generating laser light from a first blue laser source emitting a first beam of the fourth waveband, said first blue laser source having a first laser driver, generating laser light from a second blue laser source emitting a second beam having a central wavelength and a waveband, said second blue laser source having a second laser driver, generating laser light from a third red laser source emitting a third beam of the third waveband, said third red laser source having a third laser driver, generating converted light from a substrate having a wavelength conversion element for emitting light at a plurality of wavelengths after absorption of a light beam at an excitation wavelength within the waveband of the second blue laser source, said substrate being positioned in an optical path of said second beam such that light transmitted through or reflected from the wavelength conversion element results in emission of a converted beam having a waveband comprising at least the second and third wavebands, combining the first beam, third beam and the converted beam, which combination results in a white beam;

wherein light emitted by the wavelength conversion element has a green content >65%, wherein the green content is defined as a portion of light spectrum of the light emitted from the wavelength conversion element that goes into the green waveband, wherein the green waveband is in the range 495-575 nm, and a Green-Red transition zone content (GRTZC), defined as $$GRTZC\ (\%) = \frac{\int_{575\ nm}^{600\ nm} S(\lambda)d\lambda}{\int_{400\ nm}^{800\ nm} S(\lambda)d\lambda} * 100,$$

is smaller than 16%.

12. The method according to claim 11, wherein the wavelength conversion element has a green content <75%.

13. The method according to claim 11, wherein the green content is <80%.

14. The method according to claim 11, further comprising measuring the relative intensity of the first, second and third wavebands of the white beam.

15. An optical assembly for a light projection system for generating an image with three primary colors, in particular, blue, green, and red, each primary color being respectively defined by a first, second and third waveband, the optical assembly for use with:

a first blue laser source emitting a first beam in a fourth waveband, said first blue laser source having a first laser driver, a second blue laser source emitting a second beam having a central wavelength and a fifth waveband, said second blue laser source having a second laser driver, a third red laser source emitting a third beam of the third waveband, said third red laser source having a third laser driver, said assembly comprising:

a substrate having a wavelength conversion element for emitting light at a plurality of wavelengths after absorption of a light beam at an excitation wavelength within the fifth waveband of the second blue laser source, said substrate being positioned in an optical path of said second beam such that light transmitted through or reflected from the wavelength conversion element results in emission of a converted beam having a waveband comprising at least the second and third wavebands;

a beam combiner for combining the first beam, the third beam, and the converted beam, which combination results in a white beam;

wherein the light emitted by the wavelength conversion element has a green content >65%, wherein the green content is defined as a portion of light spectrum of the light emitted from the wavelength conversion element that goes into the green waveband, wherein the green waveband is in the range 495-575 nm, further comprising at least one variable waveband reduction filter provided in the optical path of the white beam.

16. The optical assembly according to claim 15, wherein a Green-Red transition zone content (GRTZC), defined as $$GRTZC(\%) = \frac{\int_{575nm}^{600nm} S(\lambda)d\lambda}{\int_{400nm}^{800nm} S(\lambda)d\lambda} * 100,$$

is smaller than 16%.

17. The optical assembly according to claim 15, further comprising an optical monitoring unit for measuring the relative intensity of the first, second and third wavebands of the white beam.

* * * * *

UNITED STATES PATENT AND TRADEMARK OFFICE
CERTIFICATE OF CORRECTION

PATENT NO. : 11,016,375 B2  
APPLICATION NO. : 16/799044  
DATED : May 25, 2021  
INVENTOR(S) : Tarpan et al.

Page 1 of 1

It is certified that error appears in the above-identified patent and that said Letters Patent is hereby corrected as shown below:

In the Claims

Column 44 Claim 1:
--Delete on Line 40: "wavebands" from "third wavebands" and insert --waveband--
--Insert on Line 61: after first beam --, the third beam,--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*